US005604798A

United States Patent [19]

Sacchetti et al.

[11] Patent Number: 5,604,798

[45] Date of Patent: Feb. 18, 1997

[54] TELEPHONE SYSTEM WITH AUTOMATIC VOLUME CONTROL

[76] Inventors: John S. Sacchetti; Mark J. Sacchetti, both of 1136 Larrabee St., #412, W. Hollywood, Calif. 90069

[21] Appl. No.: 229,206

[22] Filed: Apr. 18, 1994

[51] Int. Cl.$^{6}$ .................................................. H04M 1/72

[52] U.S. Cl. .......................... 379/387; 379/428; 379/434; 379/165; 379/422

[58] Field of Search .................................... 379/387, 376, 379/164, 165, 444, 61, 428, 434, 422, 423

[56] References Cited

U.S. PATENT DOCUMENTS

| | | | |
|---|---|---|---|
| 3,895,189 | 7/1975 | Matz | 379/75 |
| 4,107,477 | 8/1978 | Morisson | 379/164 |
| 4,536,621 | 8/1985 | Bergen et al. | 379/165 |
| 5,014,302 | 5/1991 | Kappeler et al. | 379/165 |
| 5,278,893 | 1/1994 | Voser et al. | 379/444 |

*Primary Examiner*—Jeffrey Hofsass
*Assistant Examiner*—Jacques M. Saint-Surin
*Attorney, Agent, or Firm*—Michael I. Kroll

[57] ABSTRACT

A You Talk Two Phone is provided that is a true two handset telephone device. With conventional telephones, when more than one telephone is bridged to a phone line the amplitude of the incoming and outgoing signals drop as telephones are added. The You Talk Two Phone contains two handsets and circuitry that automatically adjusts internal amplifier gain to compensate for the extra handset even when not in use. The invention has audible and visible indicators of incoming calls as well as lamps that indicate when either or both handsets are in use. A jack is provided that allows a conventional phone to plugged in, or an additional You Talk Two Phone.

3 Claims, 40 Drawing Sheets

TELEPHONE SYSTEM WITH AUTOMATIC VOLUME CONTROL

BACKGROUND OF THE INVENTION

The instant inventions relates, generally, to the field of telecommunications, and, more specifically, to telephones that are suited for bridging more than one user onto a telephone conversation in progress.

At the present state of the art, when multiple single line telephones are camped onto a single line, a number of problems occur. First, the amplitude of the incoming signal is reduced to each of the handsets. Second, the amplitude of the outgoing voice signal is diminished as more. Finally, the local telephone carrier typically charges for the number of extensions connected to a telephone trunk line. If the telephone carrier checks the line while multiple phones are operating, the carrier will charge an increased usage rate.

There are no solutions to this problem that are simple and inexpensive to implement.

SUMMARY OF THE INVENTION

It is, therefore, a primary object of the present invention to provide what is hereinafter referred to as a You Talk Two Phone that provides two handsets so that a second party can pick up a handset and joint in the conversation.

Another object is to provide a You Talk Two Phone that does not change in volume or in quality as the second handset is picked up of returned to its cradle.

A further object is to provide a You Talk Two Phone that provides a visible alert when incoming calls are ringing. This visible alert is a flashing set of LEDs.

A still further object is to provide a You Talk Two Phone that provides an audible alert when incoming calls are ringing. This audible alert is a pair of bells that sound with nearly musical quality.

Another object is to provide a You Talk Two Phone that has a thru jack that allows conventional phones to be plugged in or additional You Talk Two Phones.

A final object is to provide a You Talk Two Phone that has visible indicators to alert the user that one or both handsets are in use.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

PARTS LIST OF NUMBERED REFERENCE DRAWINGS

Figure 1A:
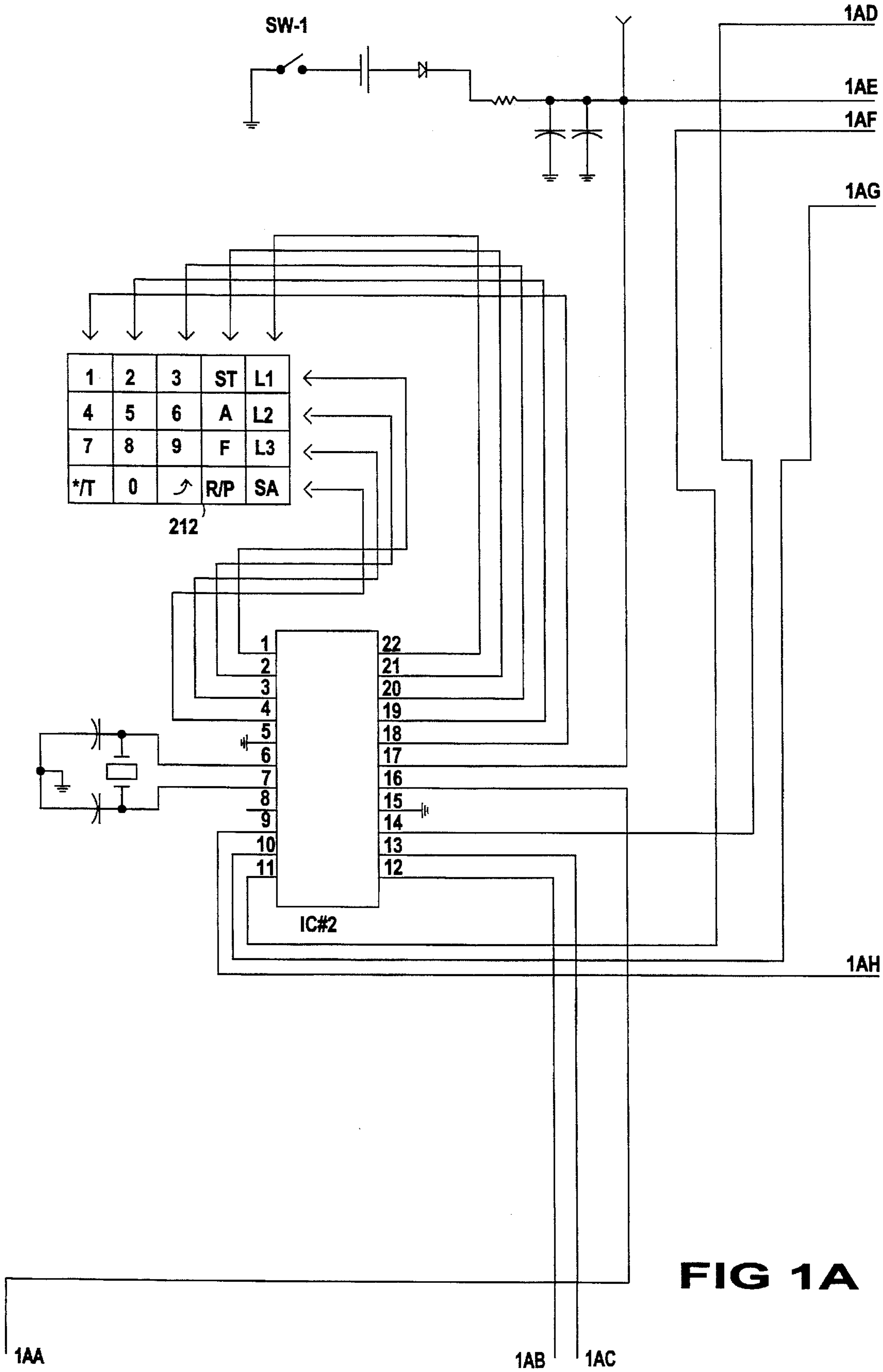
FIG. 1 is an electronic schematic diagram of an overview of the invention.

| Reference Number | Description |
|---|---|
| IC#1 | Ringer IC - Motorola MC344017 |
| IC#2 | Dialer IC - MS6263 |
| IC#3 | Speech Network IC - Motorola MC34014 |
| IC#4 | Hex Inverters 74HC14 |
| IC#5 | Hex NAND Gates 74HC00 |
| J1 to Jn | Jacks |
| L1–I8 | Flash Bar Lamps |
| 7 | Polarity Protection Circuit |
| 10 | Resistor |
| 11 | Capacitor |
| 12 | Ringer IC Motorola MC344017 |
| 16 | Left Bell |
| 18 | Right Bell |
| 22 | Bell Switch Sp3T |
| 24A | Resistor |
| 25 | Resistor |
| 26 | Resistor |
| 27A | Zener Diode |
| 32 | Resistor |
| 33 | Transistor Q3 NPN |
| 40J | IDC Connector #1 |
| 40K | IDC Connector #2 |
| 44 | Diode |
| 45 | Diode |
| 48 | Ringer Circuit - OKI MS6263 |
| 48B | DTMF Touch Tone Pad |
| 48A | Crystall for Ringer Circuit |
| 48C | Battery Backup/Test Circuit |
| 48D | Tone/Pulse Switch |
| 50C | Resistor |
| 50D | Transistor Q1 NPN |
| 50E | Transistor Q2 NPN |
| 50F | Resistor |
| 52 | Speech Network IC - Motorola MC34014 |
| 53A | Capacitor |
| 55A | RED LED |
| 55B | Resistor |
| 55C | Diode |
| 55D | Diode |
| 55E | Resistor |
| 55F | Resistor |
| 55G | Capacitor |
| 55H | Capacitor |
| 55I | Capacitor |
| 55J | Capacitor |
| 55L | Resistor |
| 55M | GREEN LED |
| 55N | BLUE LED |
| 58 | Transistor Q4 NPN |
| 58A | Resistor |
| 58C | NAND Gate |
| 58D | NAND Gate |
| 58E | Inverter |
| 58F | Inverter |
| 60 | Diode |
| 60A | Resistor |
| 60B | Capacitor |
| 61 | Diode |
| 61A | Resistor |
| 61B | Capacitor |
| 62B | Resistor |
| 63 | Hold Generator Circuit |
| 63B | Resistor |
| 63C | Transistor Q5 NPN |
| 63E | Hold Button |
| 63F | Redial/Hold Lamp Assembly |
| 63H | IC Hex Inverter |
| 63I | NAND Gate |
| 68A | NAND Gate |
| 100 | Resistor |
| 101 | Capacitor |
| 102 | Switched Capacitor Filter |
| 103 | Switched Capcitor Filter |
| 104 | Capacitor |

-continued

| PARTS LIST OF NUMBERED REFERENCE DRAWINGS | |
|---|---|
| Reference Number | Description |
| 105 | Capacitor |
| 106 | Capacitor |
| 107 | Transistor Q15 - PNP |
| 108 | Transistor Q16 - NPN |
| 109 | Resistor |
| 110 | Resistor |
| 111 | Resistor |
| 112 | Resistor |
| 113 | Capacitor |
| 114 | Capacitor |
| 115 | Resistor |
| 116 | Resistor |
| 117 | Resistor |
| 118 | Resistor |
| 119 | Resistor |
| 120 | Transistor Q11 - PNP |
| 121 | Transistor Q12 - PNP |
| 122 | Resistor |
| 123 | Resistor |
| 200 | Left Cradle Switch |
| 202 | Right Cradle Switch |
| 204 | Left Earpiece |
| 206 | Left Microphone Headset |
| 208 | Right Earpiece |
| 210 | Right Microphone Headset |
| 212 | DTMF Touch Tone Pad |
| 214 | Flash Bar Indicator |
| 216 | Left Bell |
| 218 | Right Bell |
| 220 | Bell Volume Switch SP3T |
| 222 | Green Left Hand Handset In Use Light |
| 224 | Red Right Hand In Use Light |
| 226 | Tone/Pulse Signalling Switch SPDT |
| 228 | Redial Momentary Contact Switch |
| 230 | Redial Indicator-Light Emitting Diodes |
| 232 | Hold Momentary Contact Switch |
| 234 | Hold Indicator Light Emitting Diodes |
| 236 | Blue Both Hansets In Use Light |

DETAILED DESCRIPTION OF THE PREFERRED EMBODIMENTS

Figure 1B:
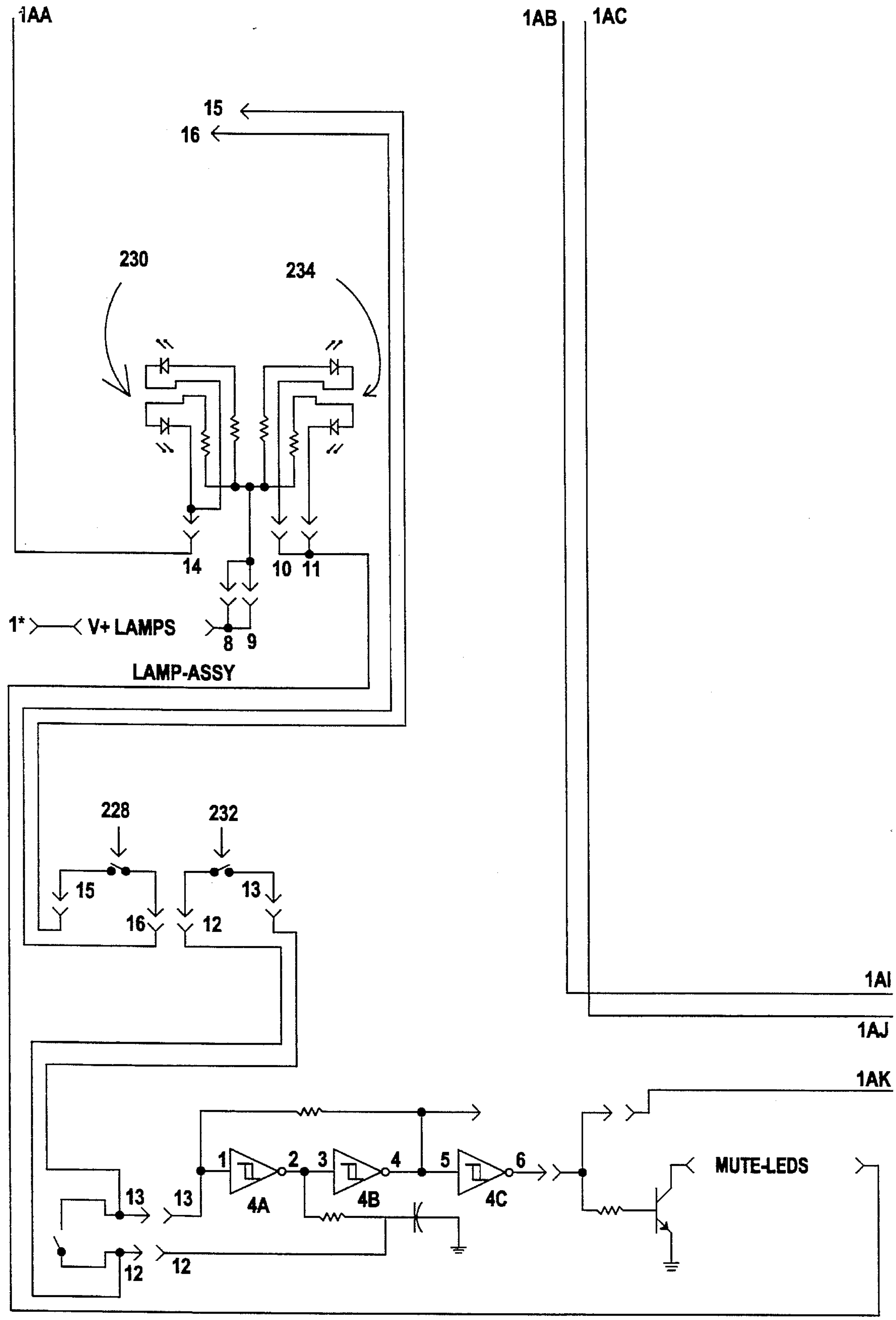
Figure 1C:
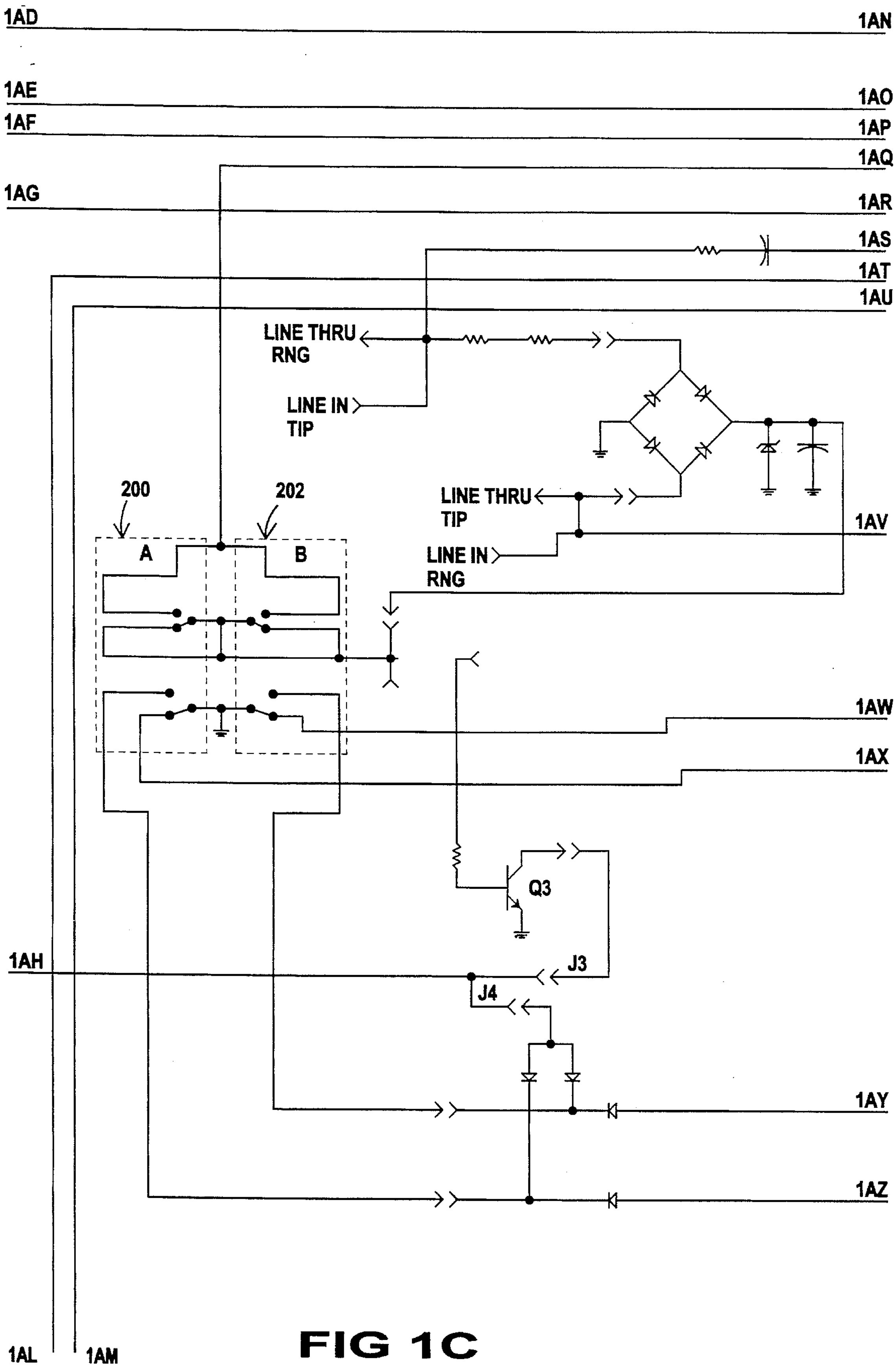
Figure 1D:
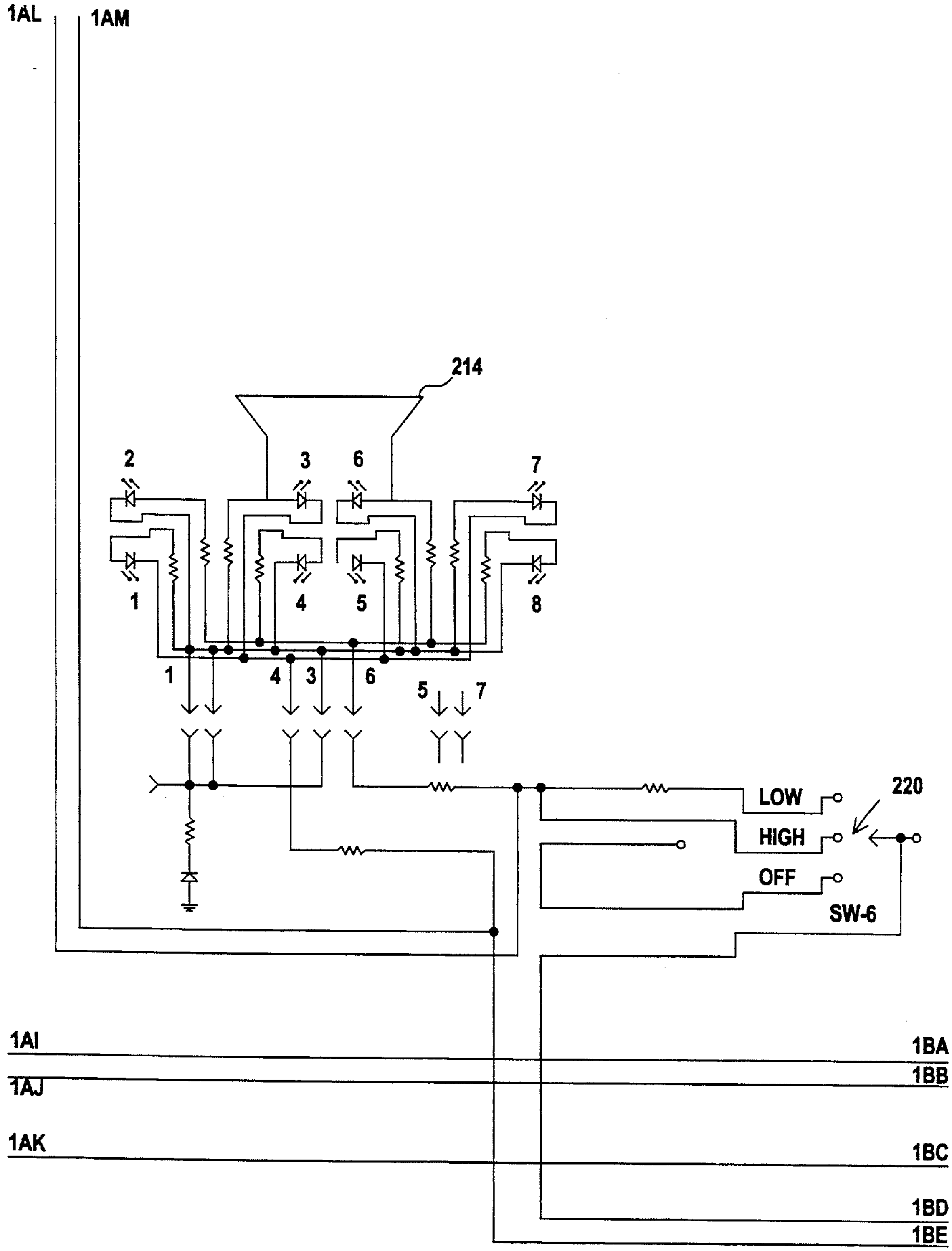
Figure 1E:
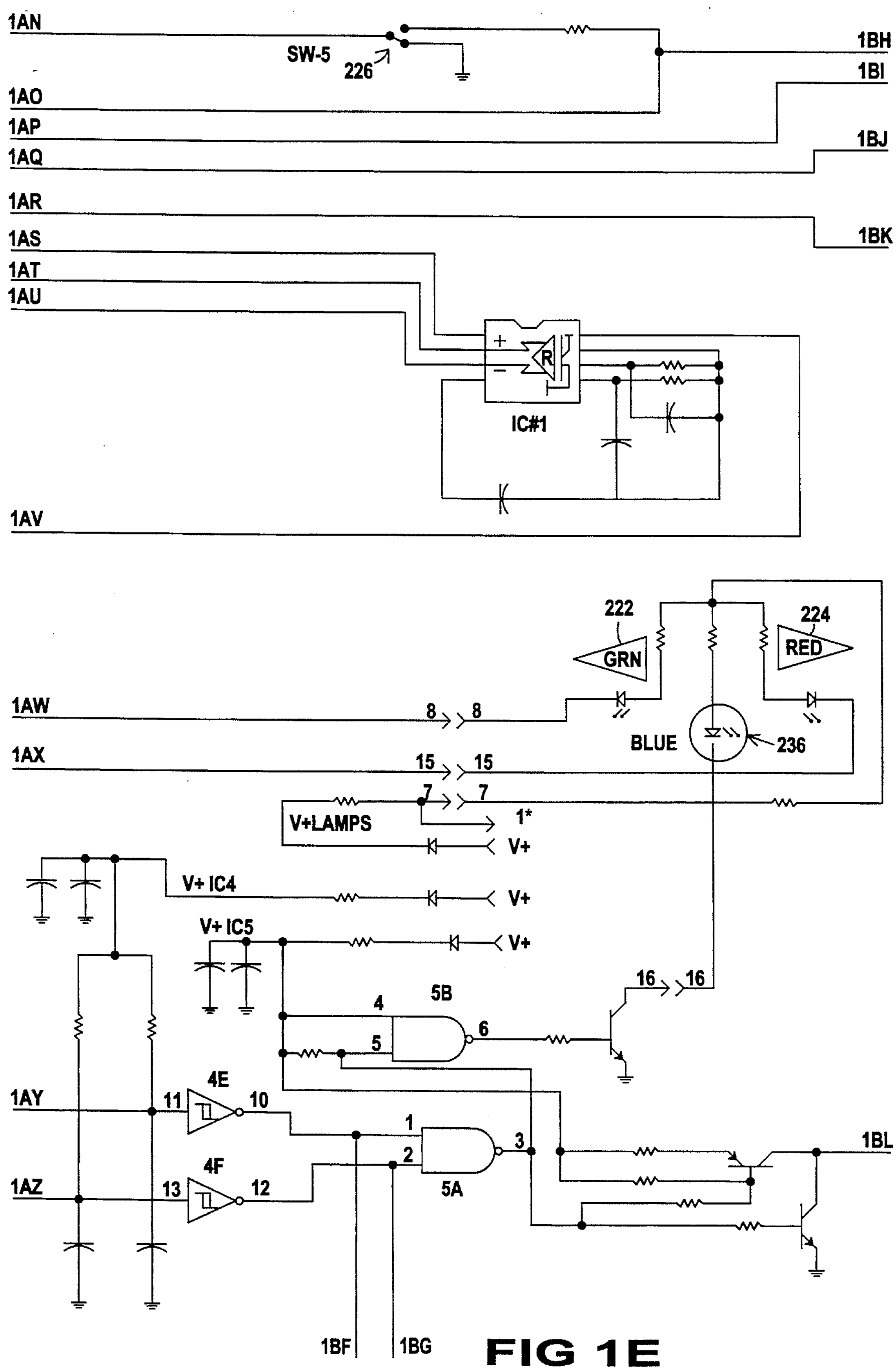
Figure 1F:
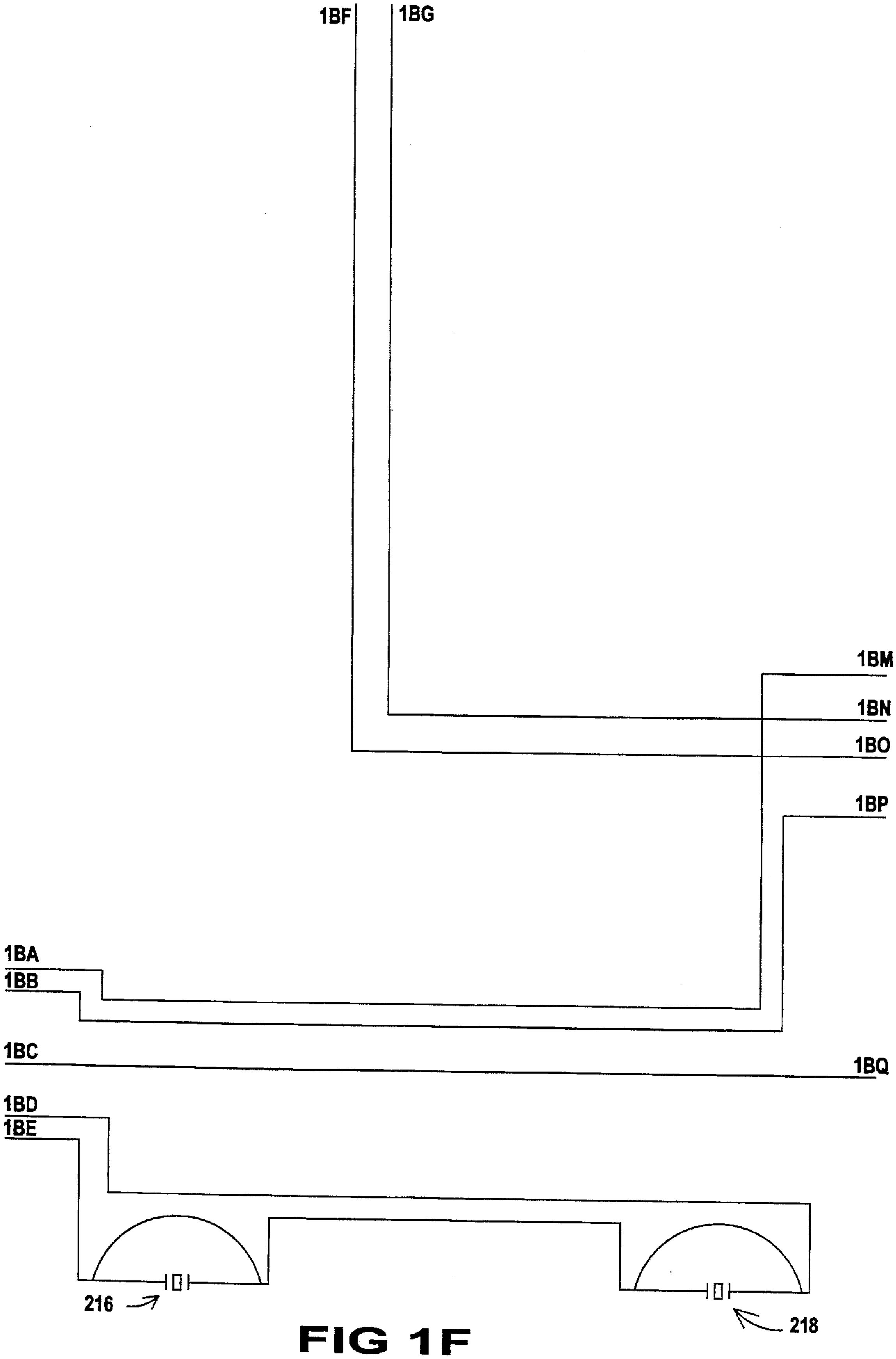
Figure 1G:
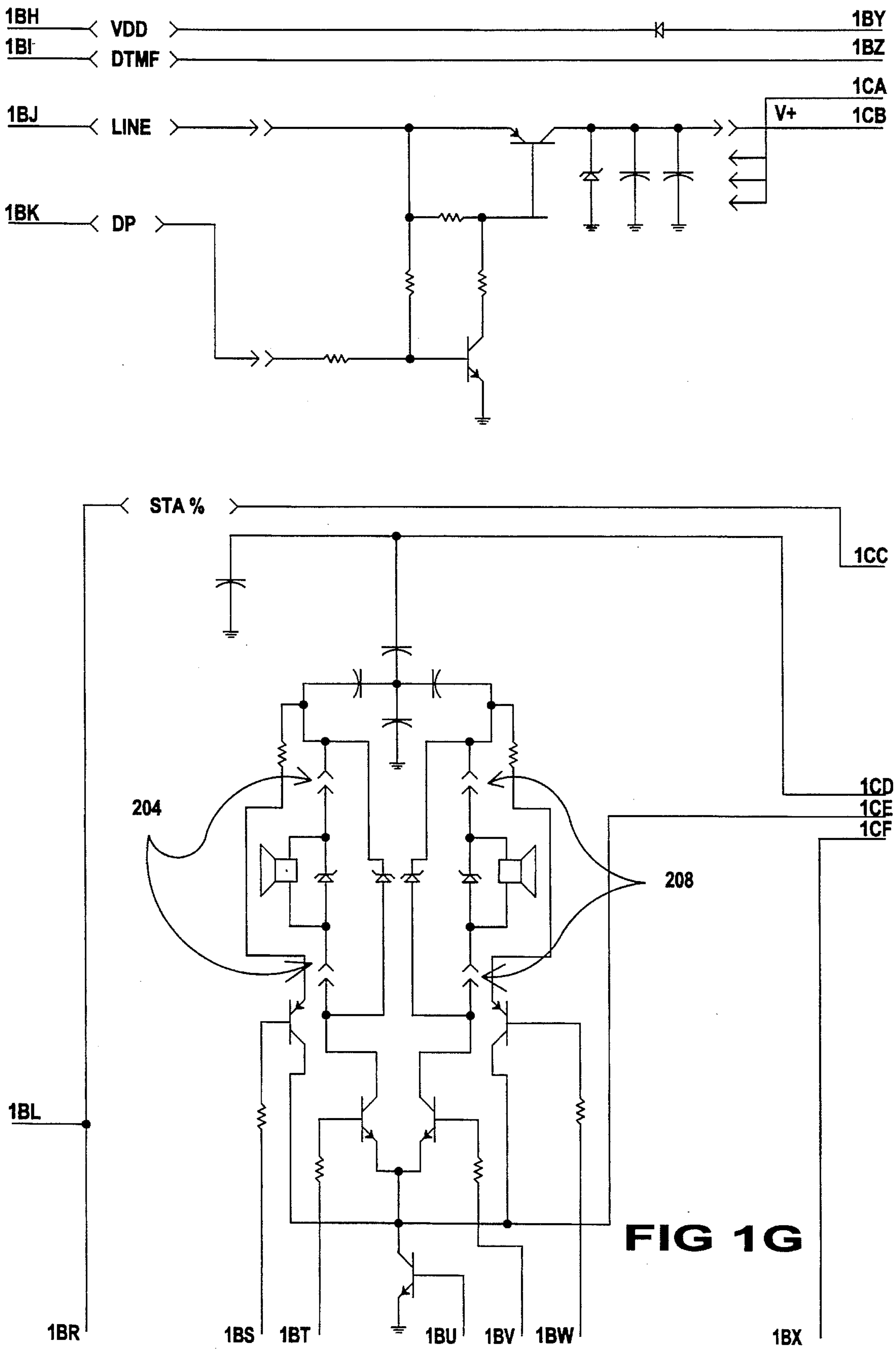
Figure 1H:
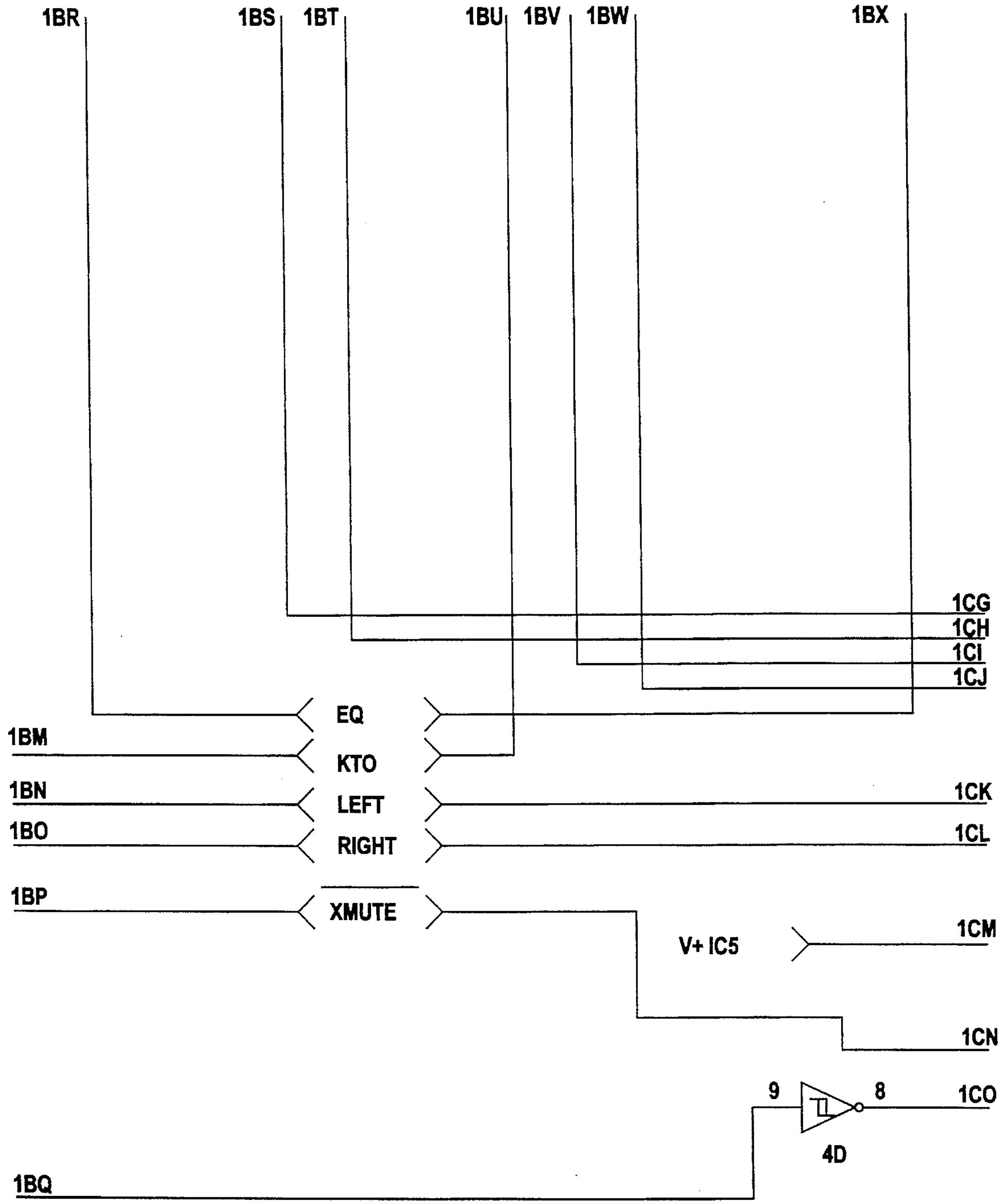
Figure 1I:
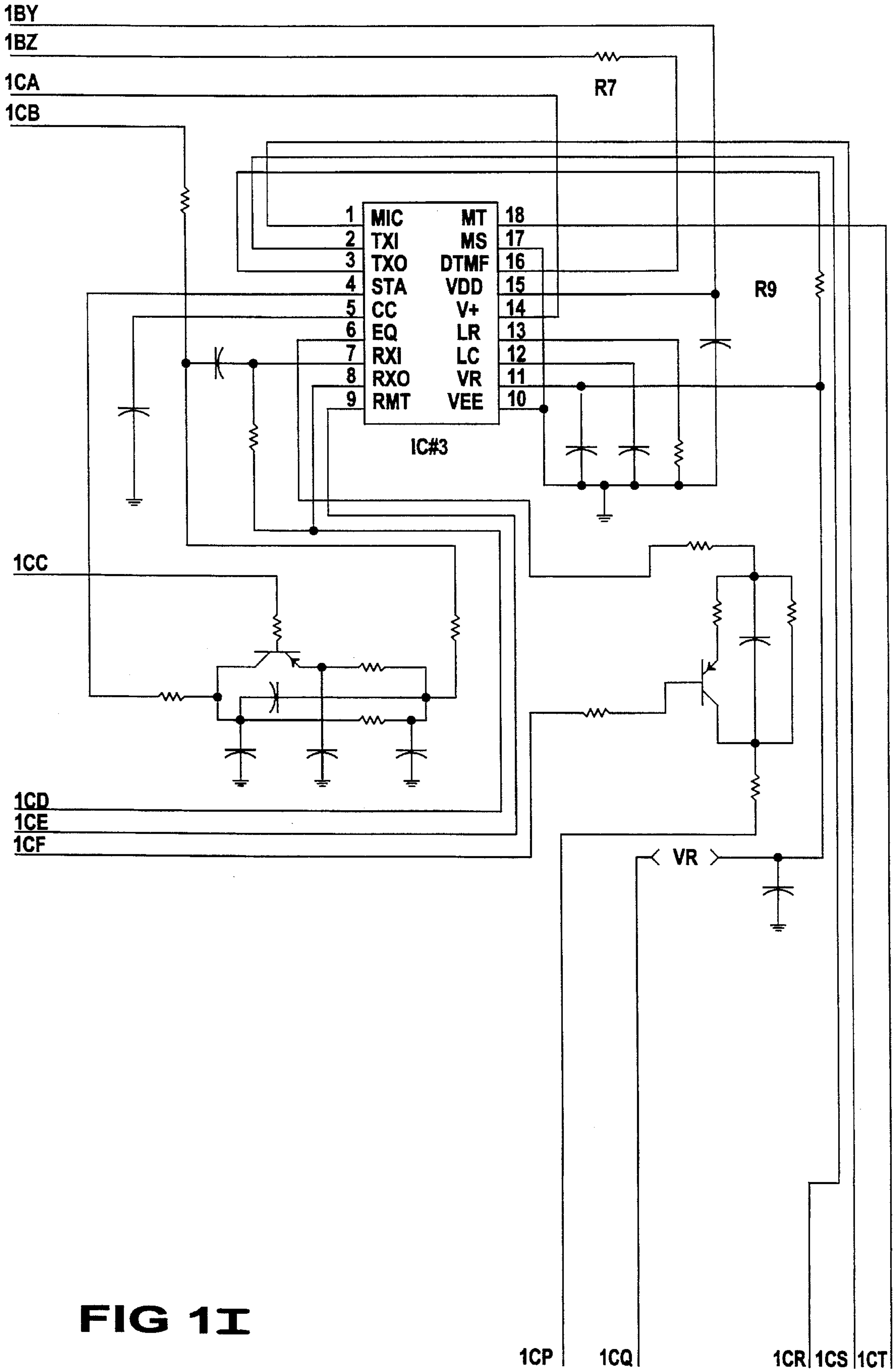
Figure 1J:
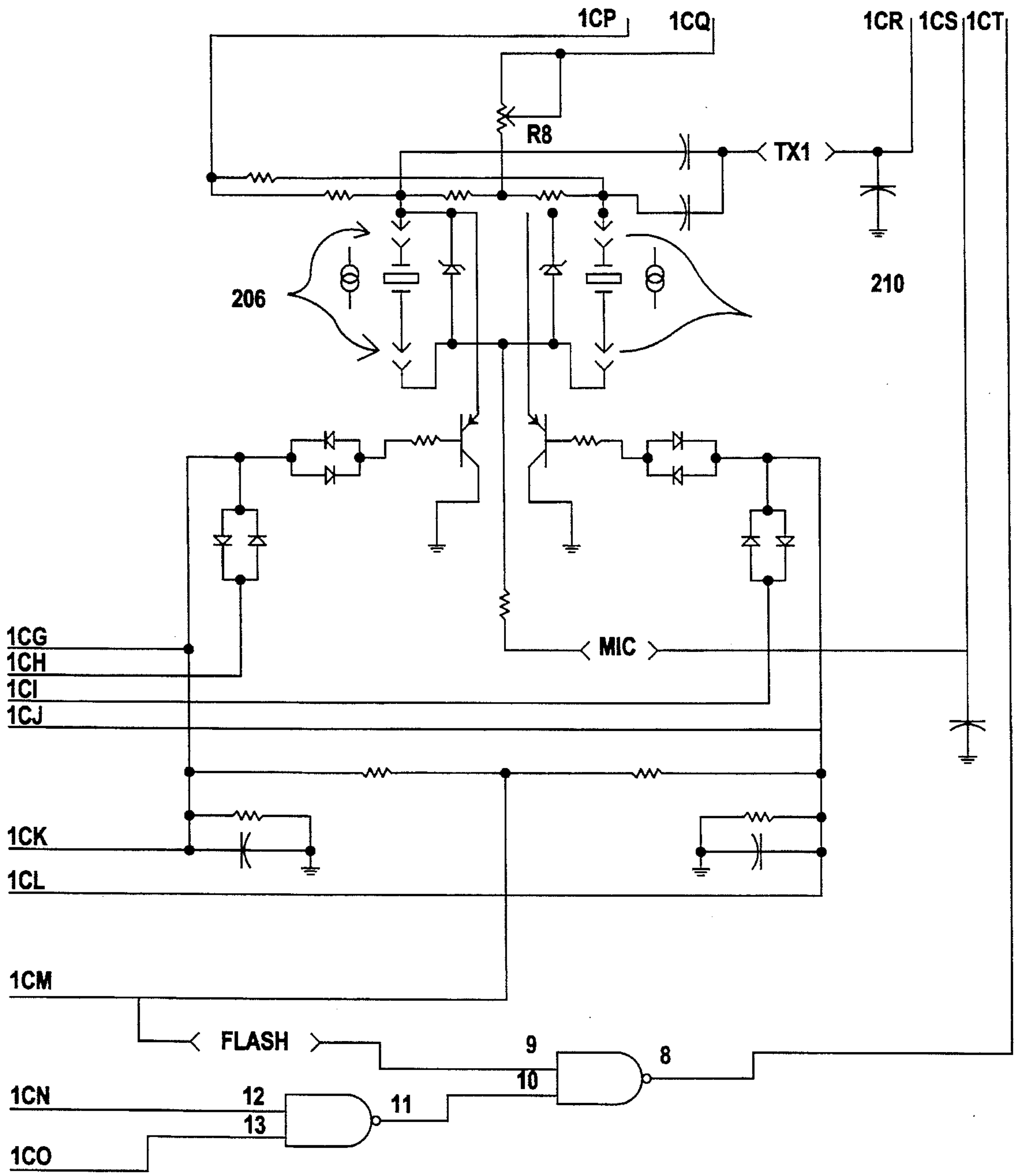
Figure 2A:
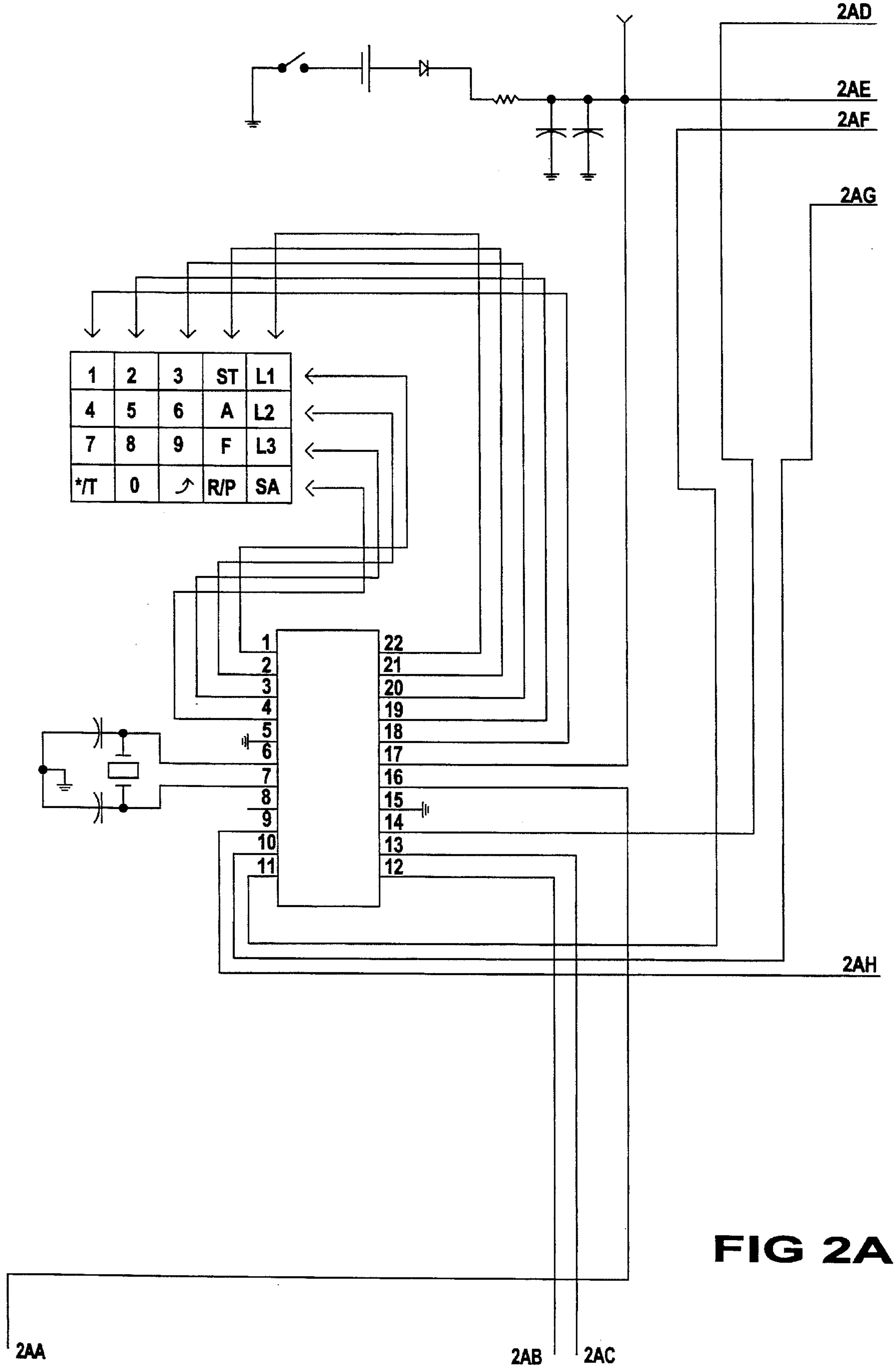
FIG. 2 is an electronic schematic diagram of the invention with emphasis on the ringing circuits illustrated.
Figure 2B:
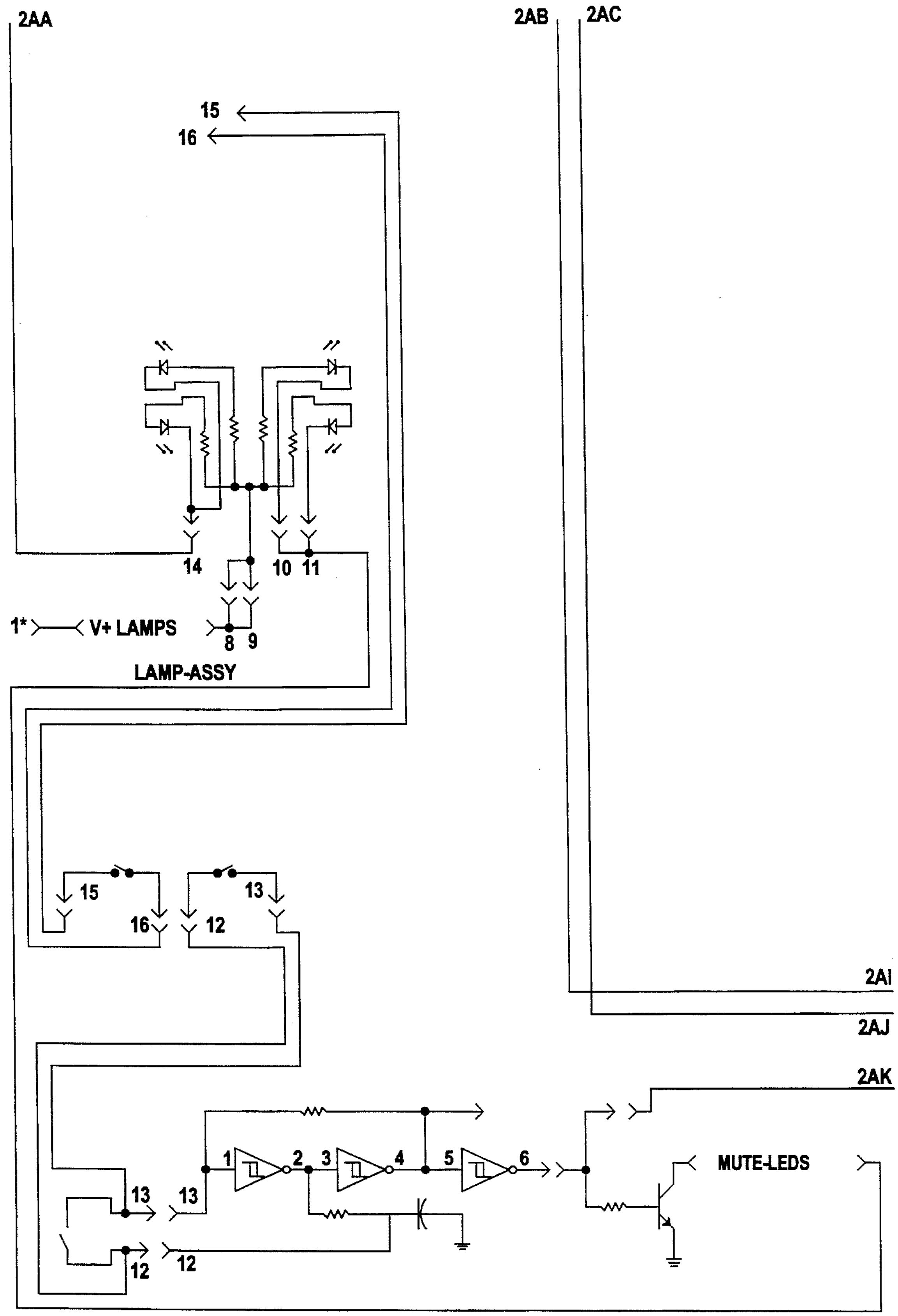
Figure 2C:
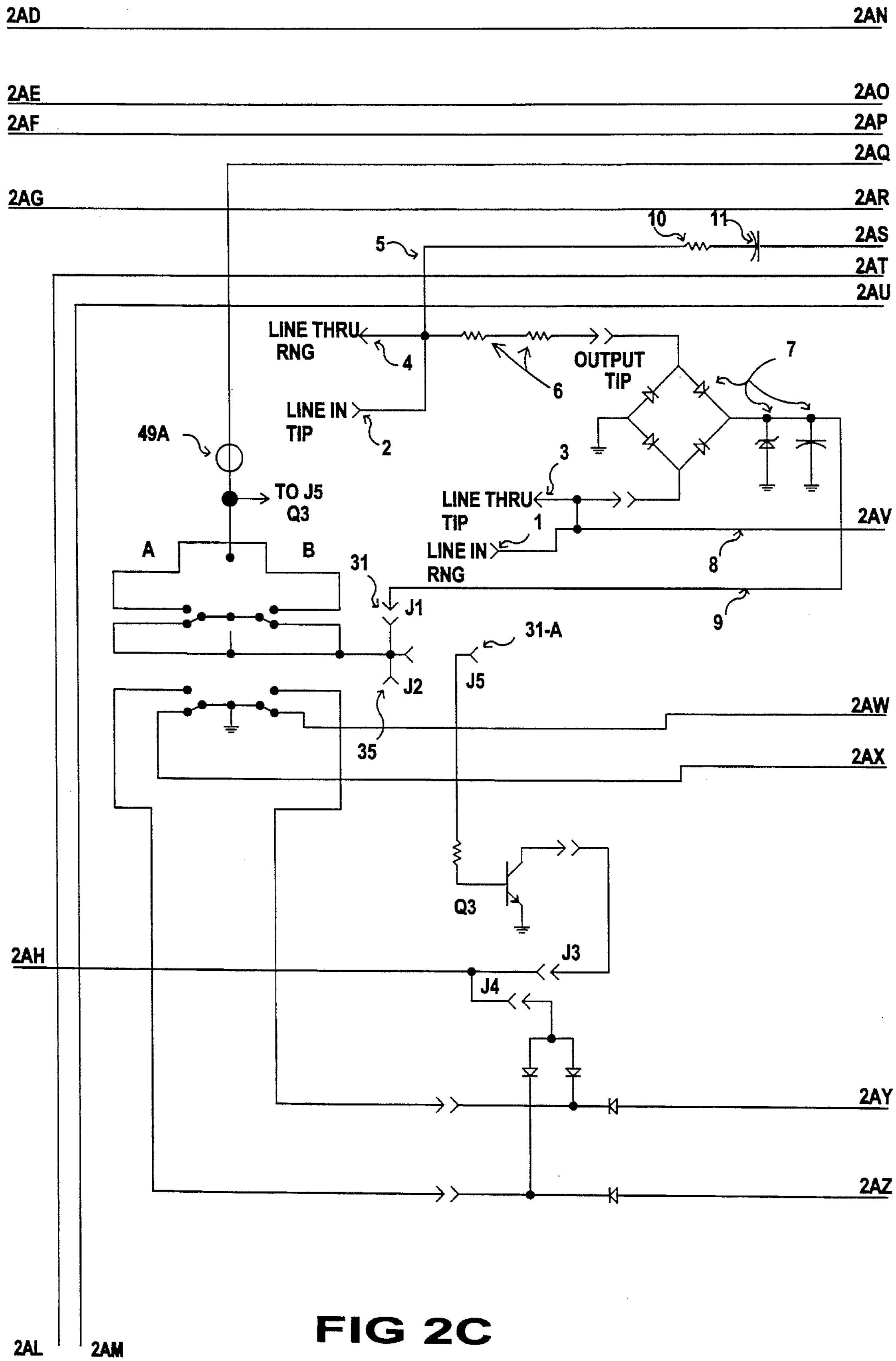
Figure 2D:
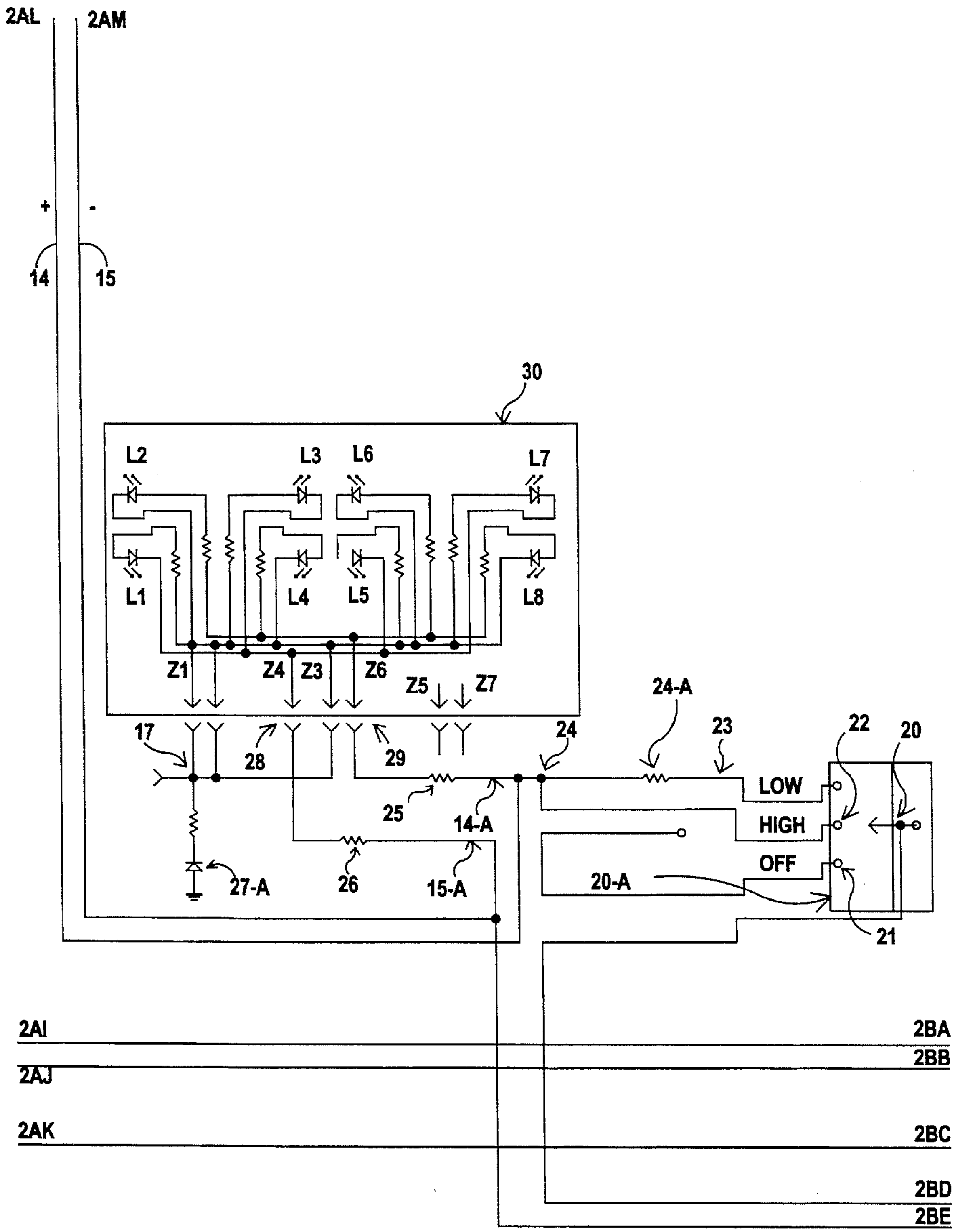
Figure 2E:
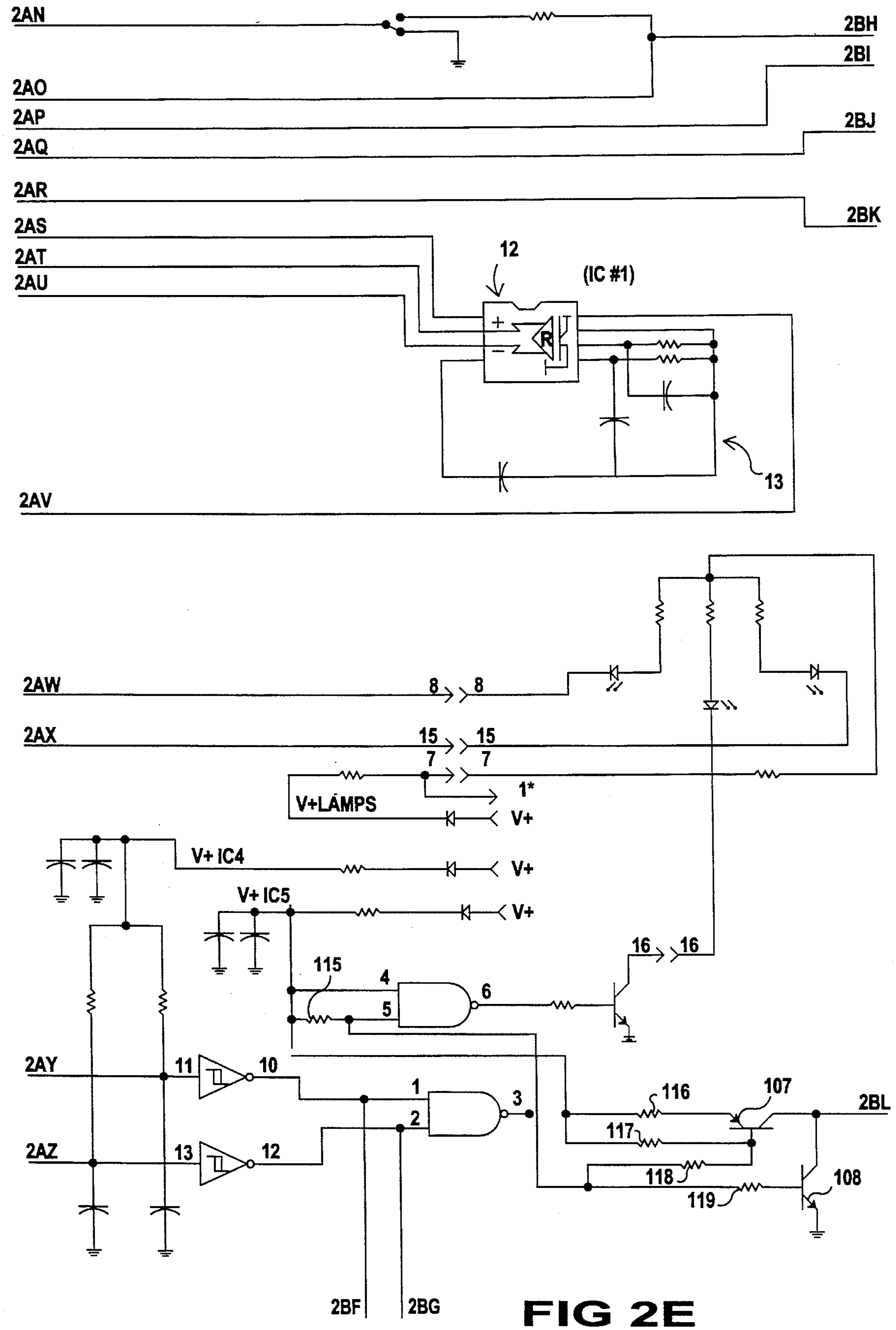
Figure 2F:
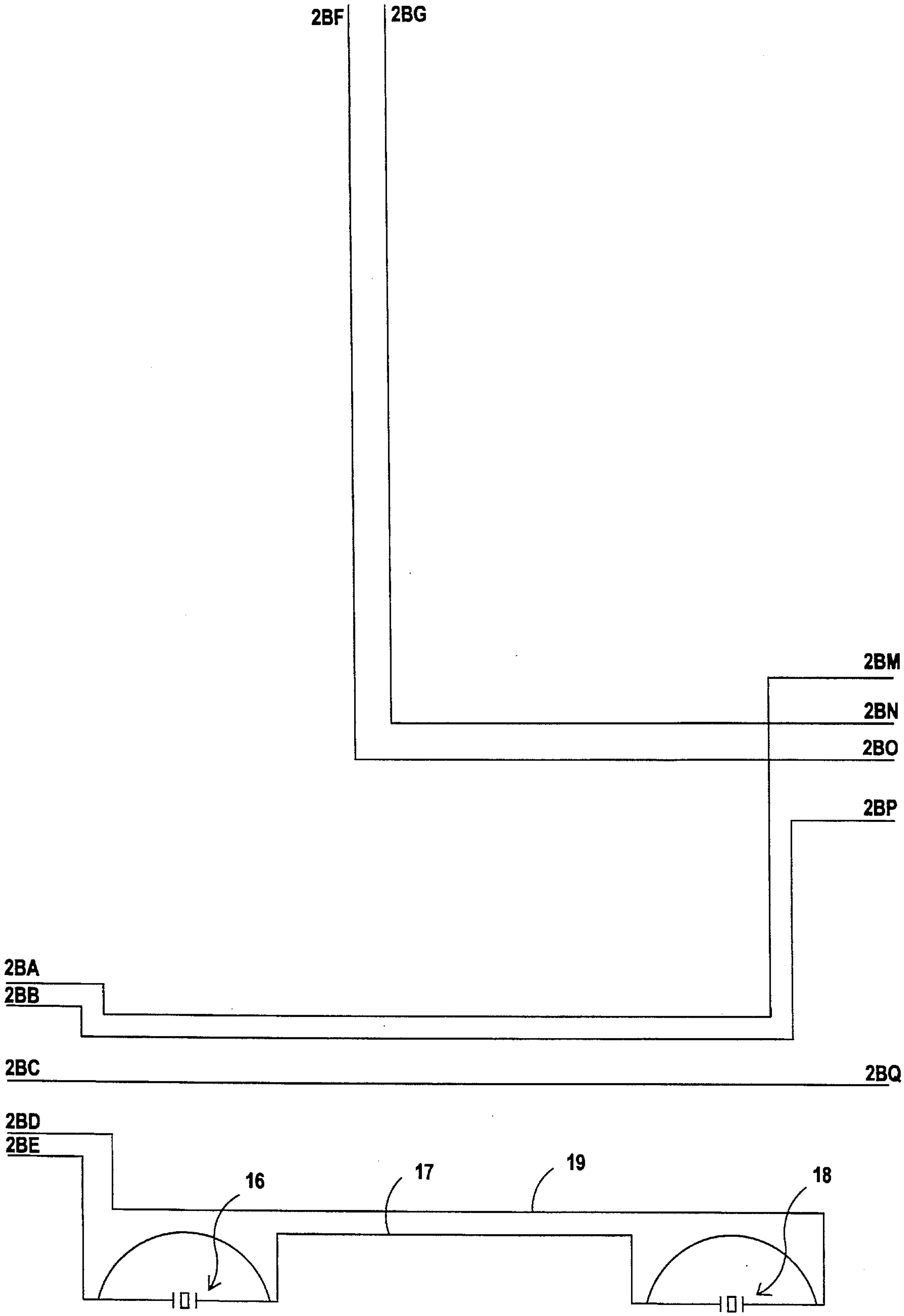
Figure 2G:
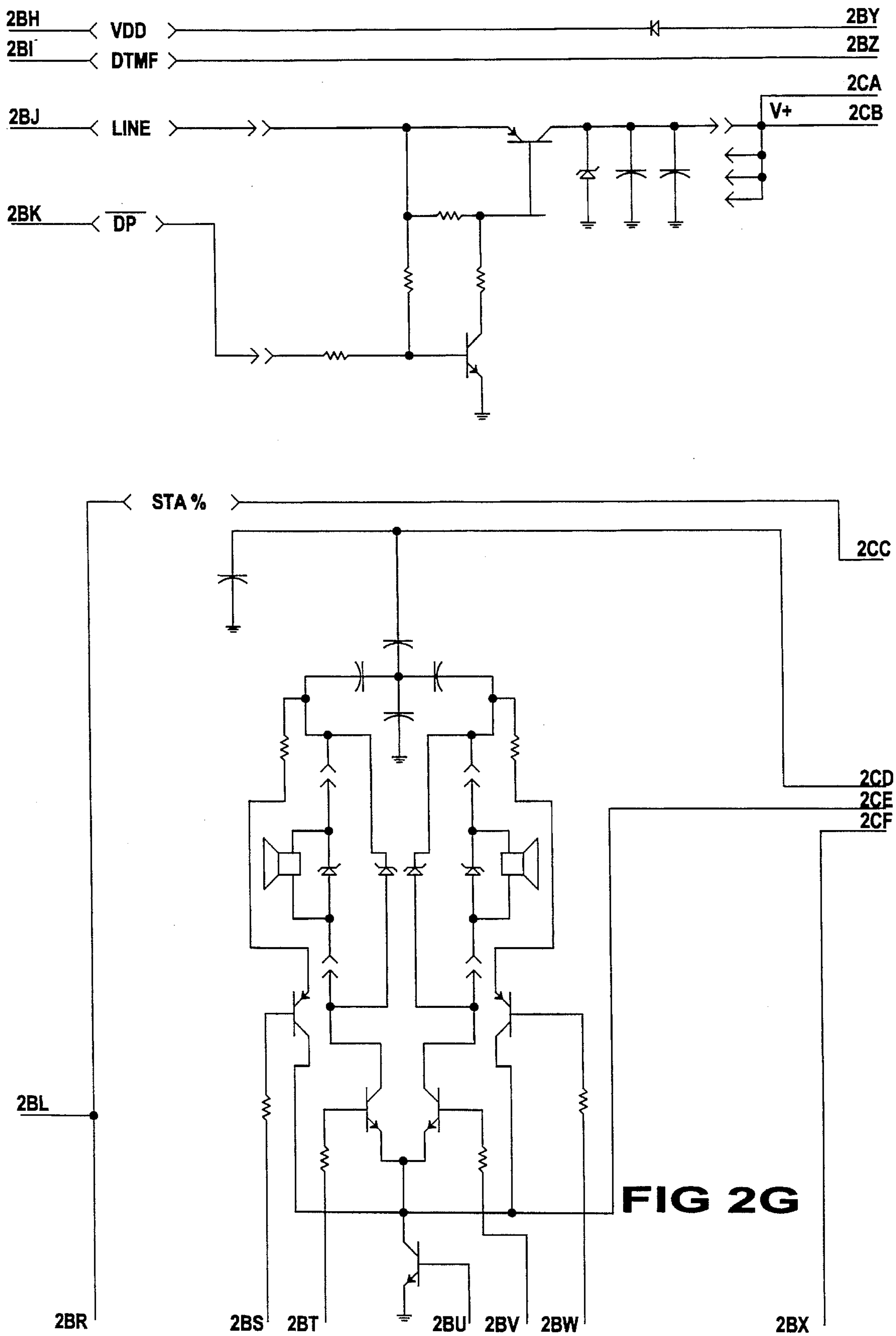
Figure 2H:
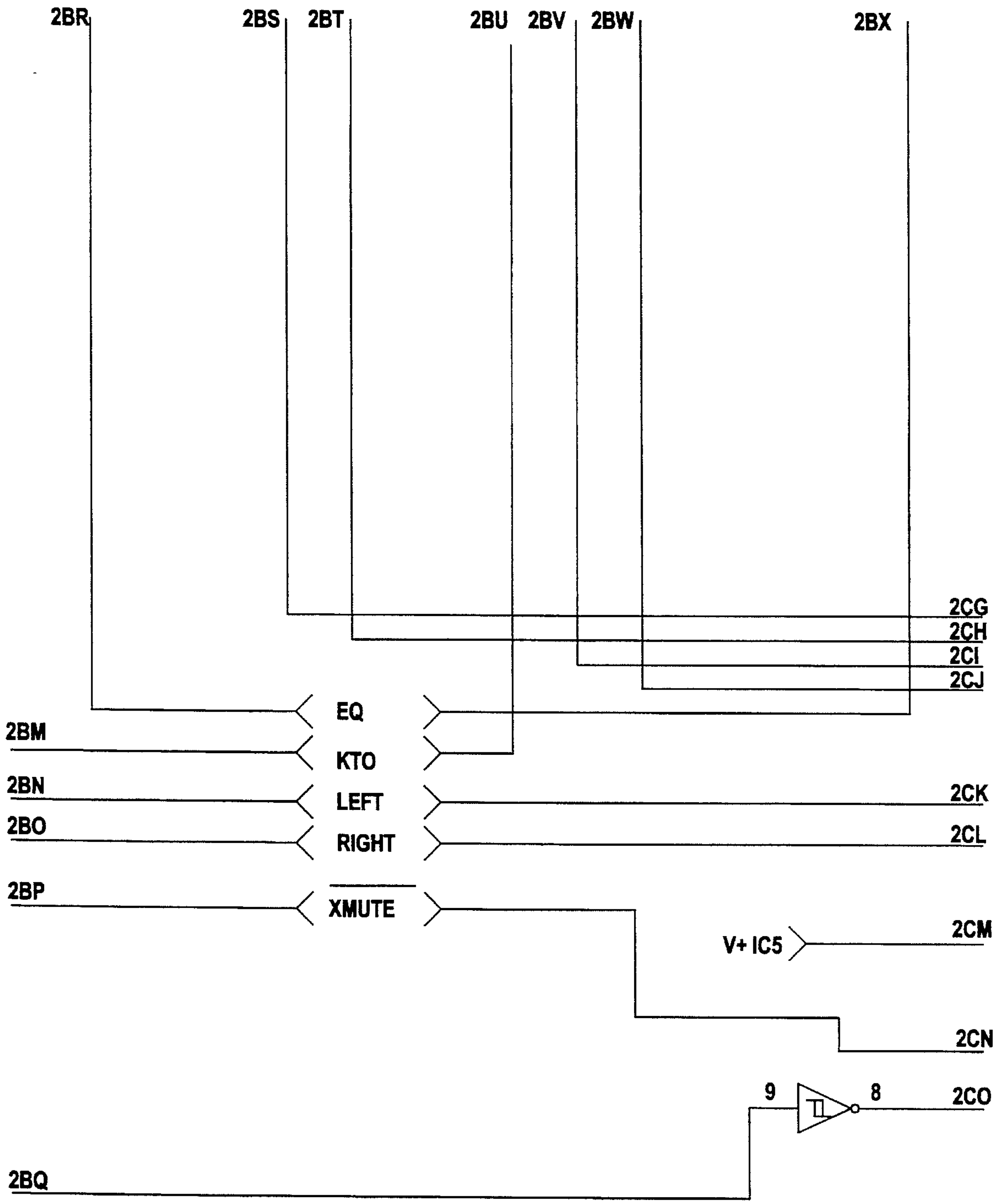
Figure 2I:
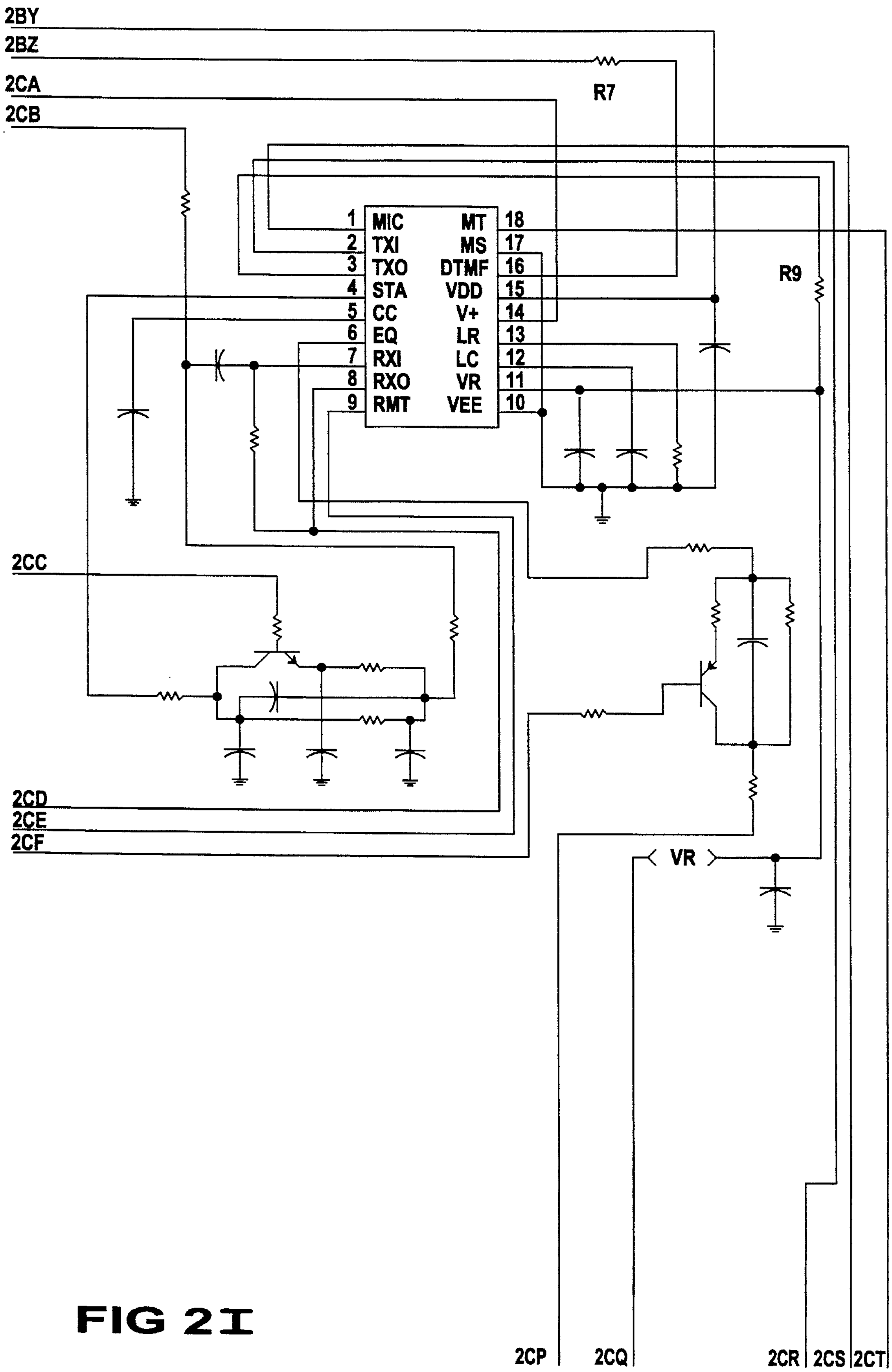
Figure 2J:
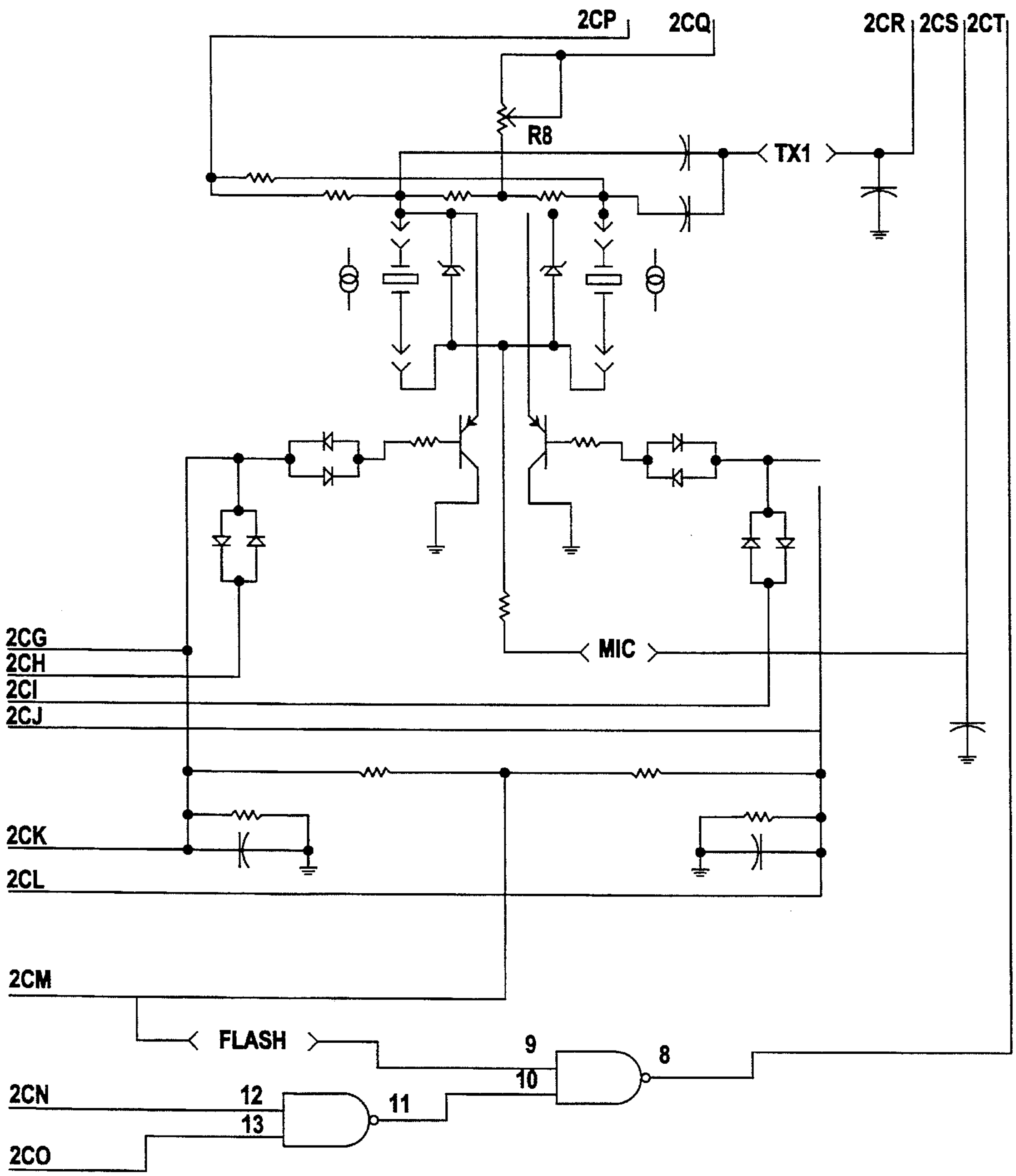
Figure 3A:
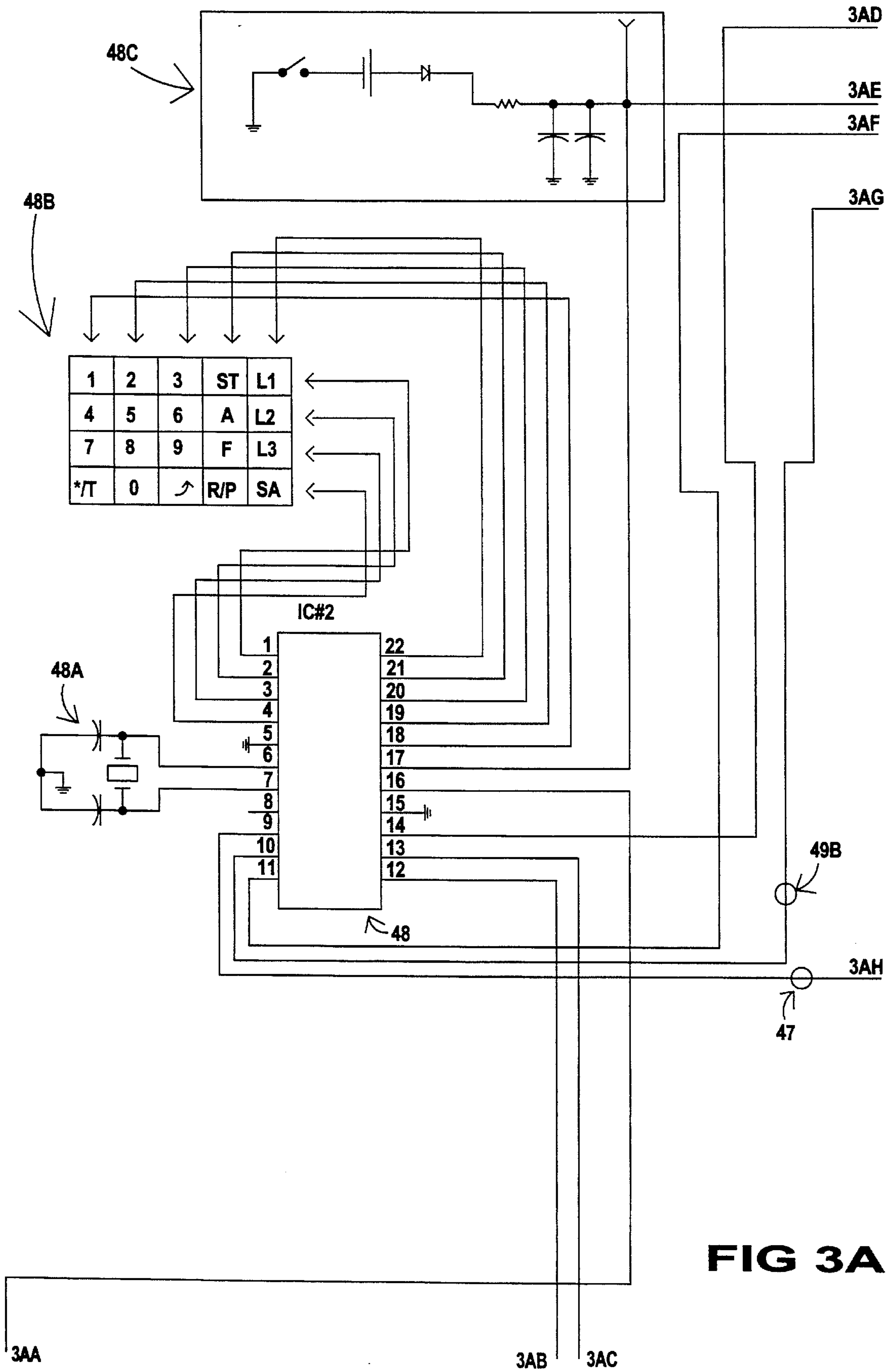
FIG. 3 is an electronic schematic diagram of the invention with emphasis on the logic circuits illustrated.
Figure 3B:
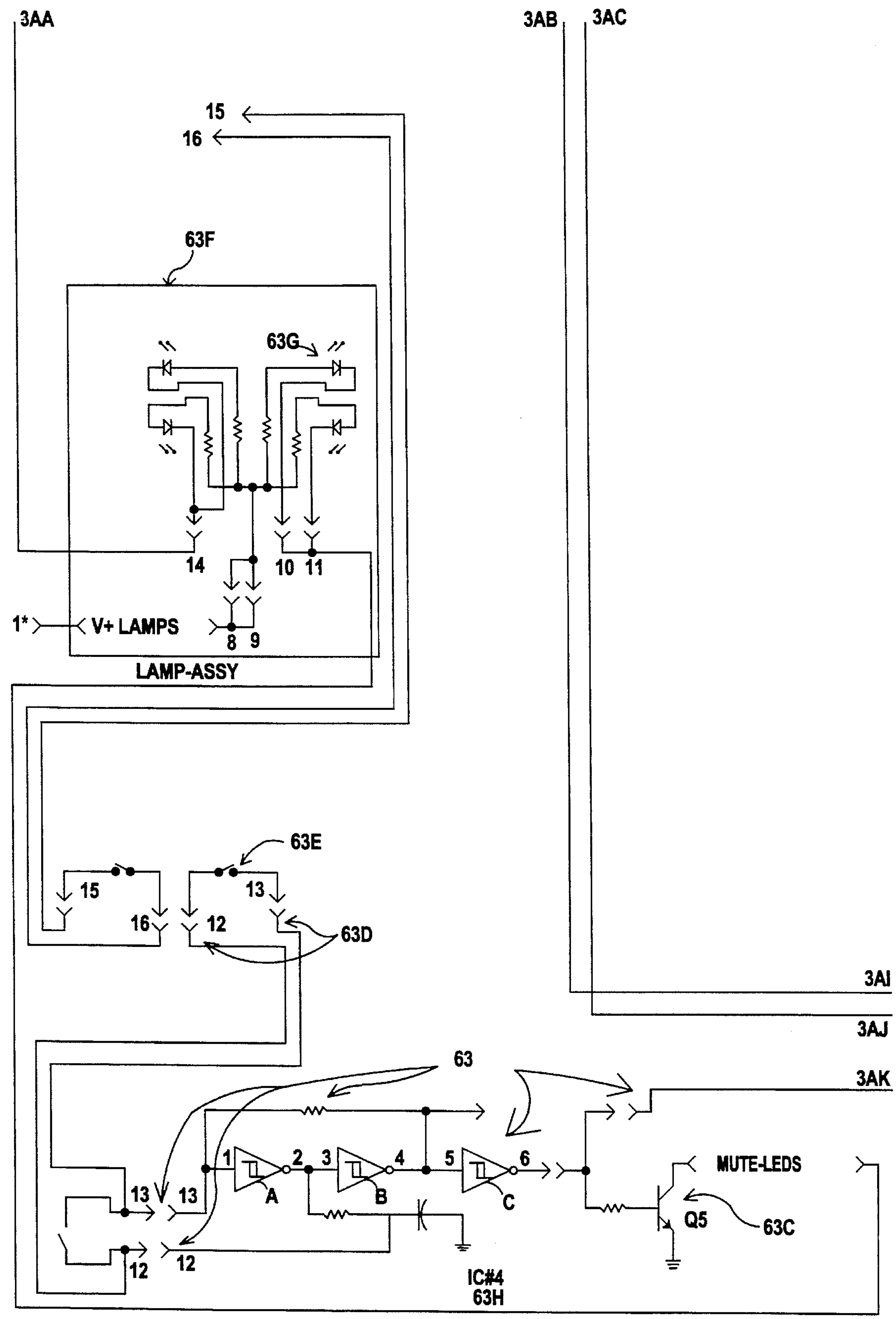
Figure 3C:
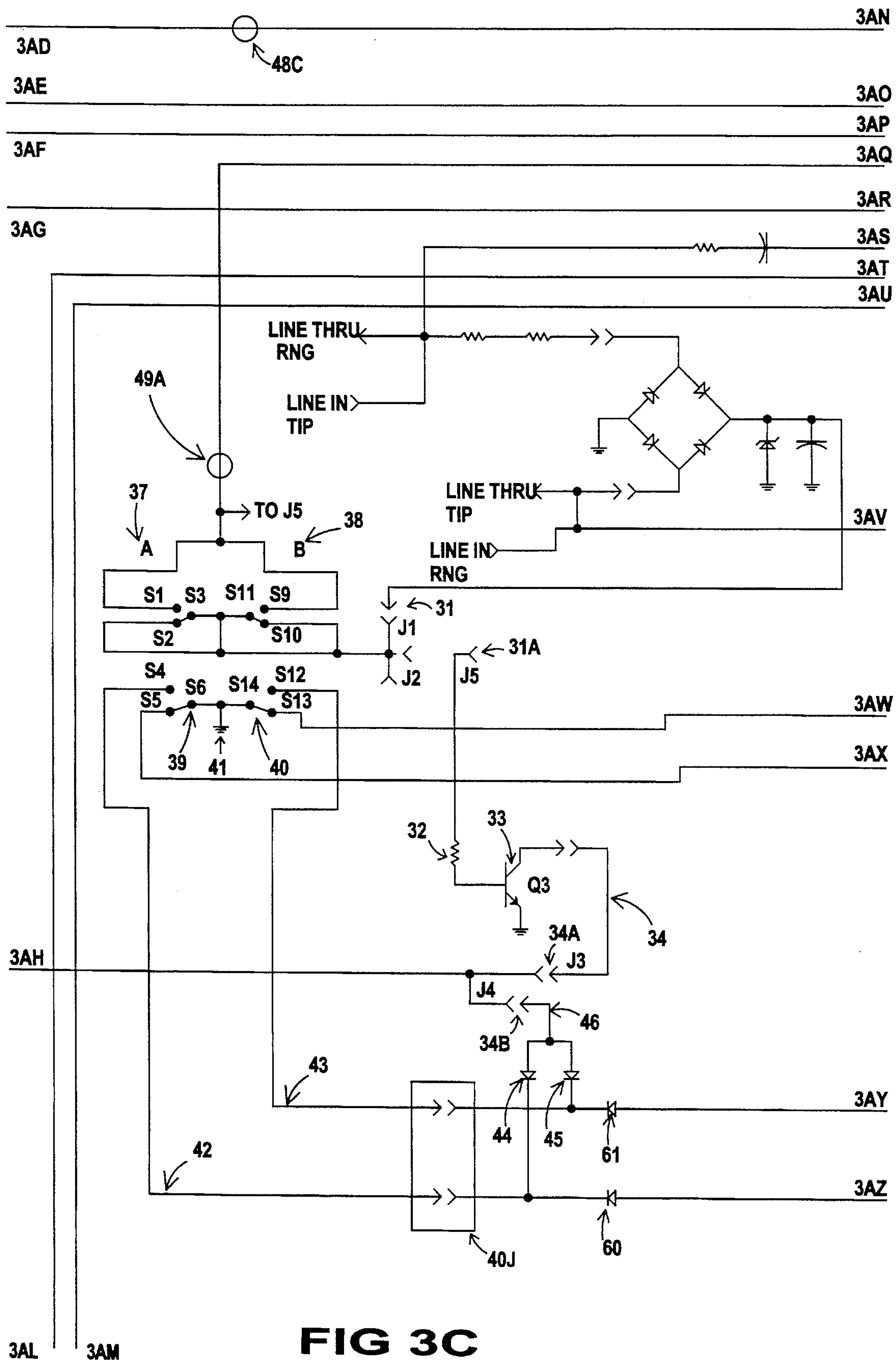
Figure 3D:
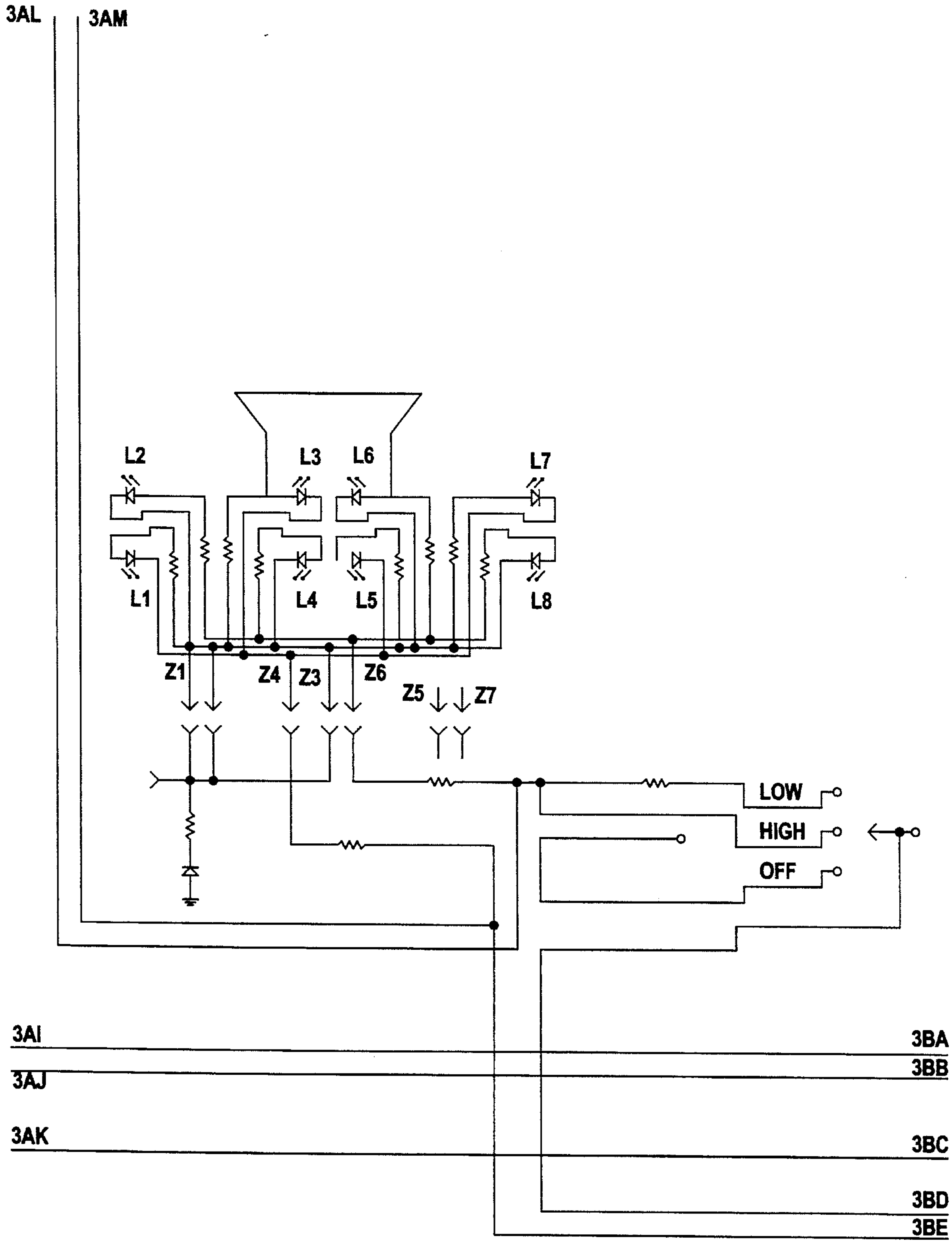
Figure 3E:
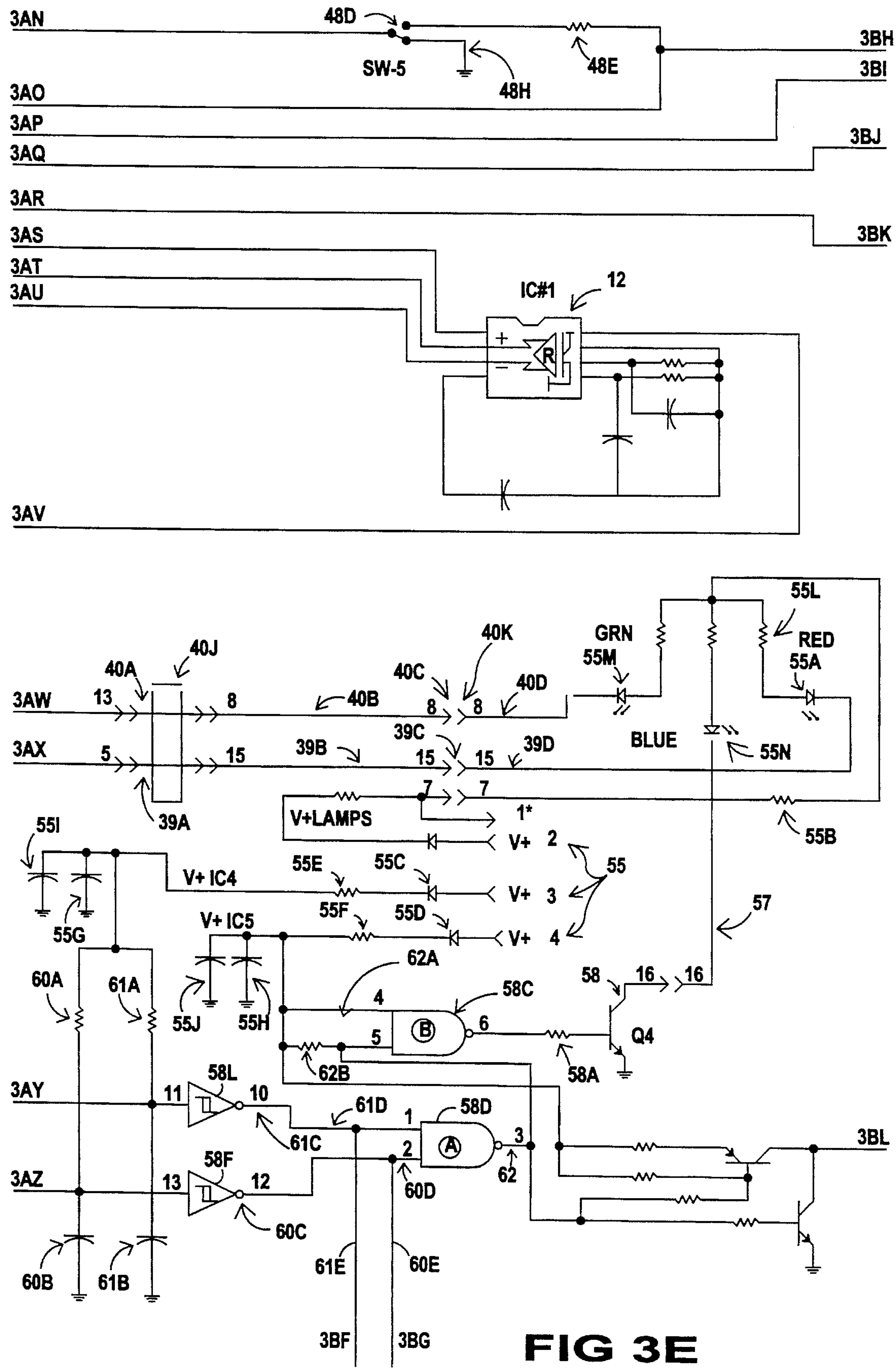
Figure 3F:
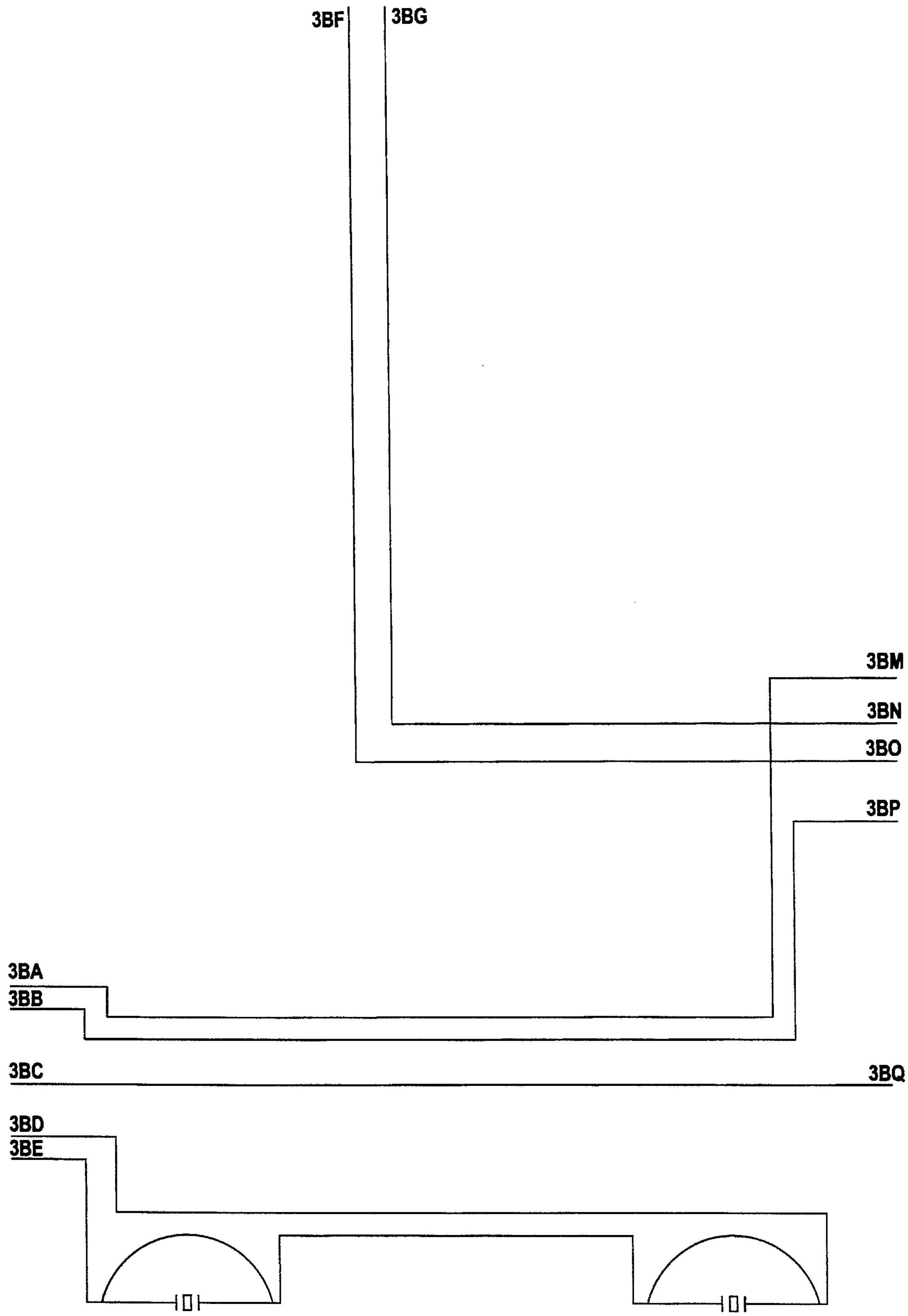
Figure 3G:
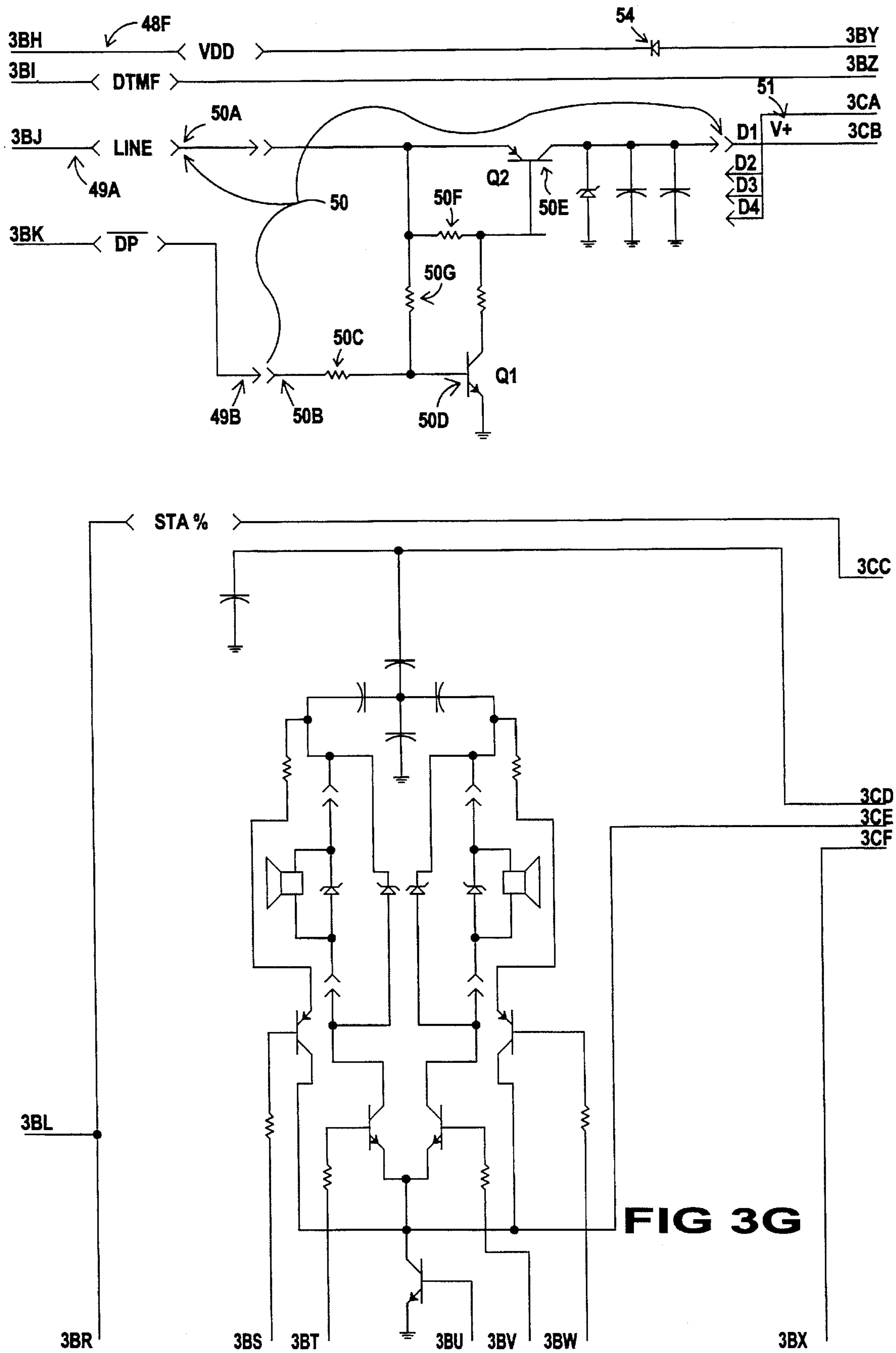
Figure 3H:
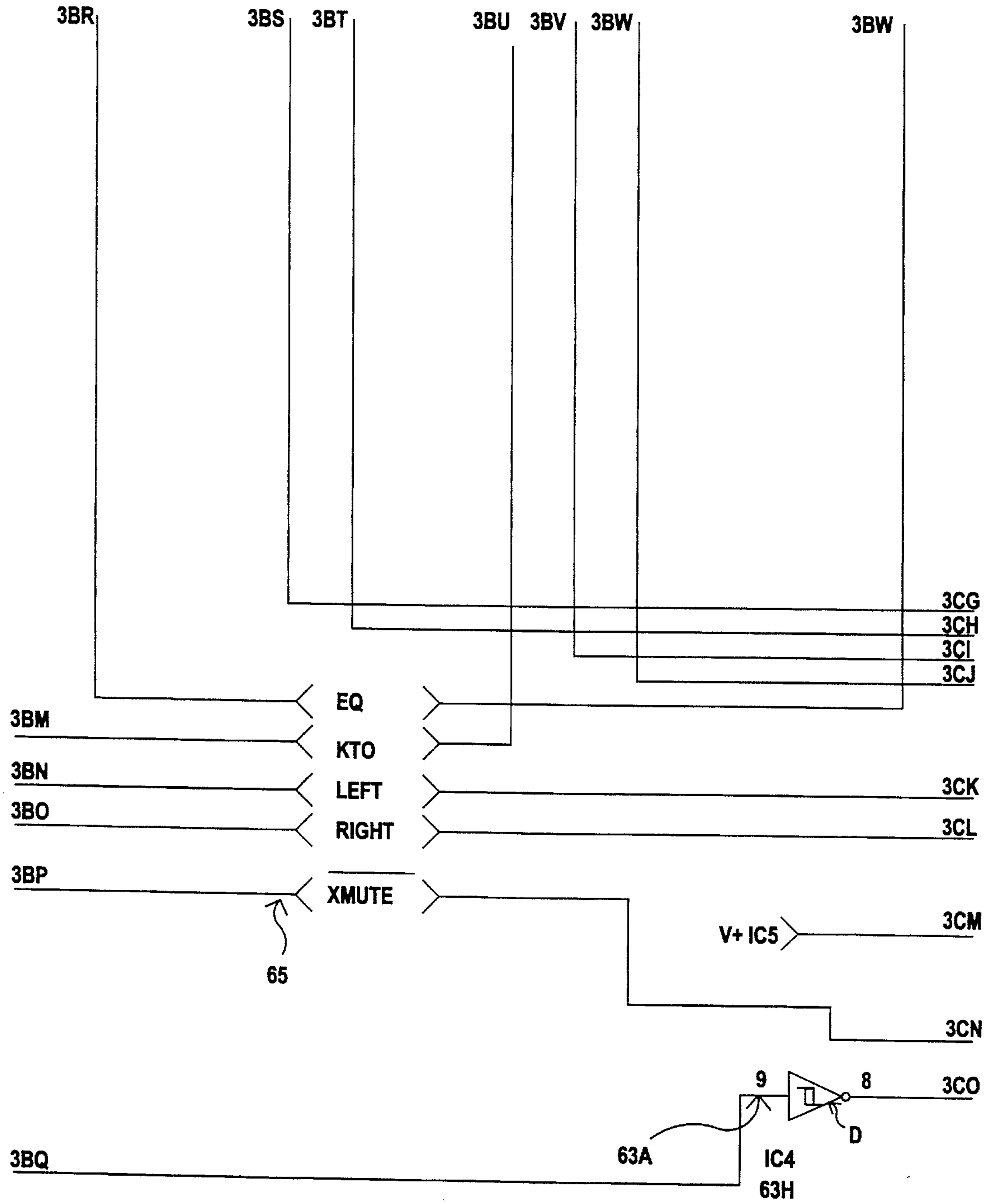
Figure 3I:
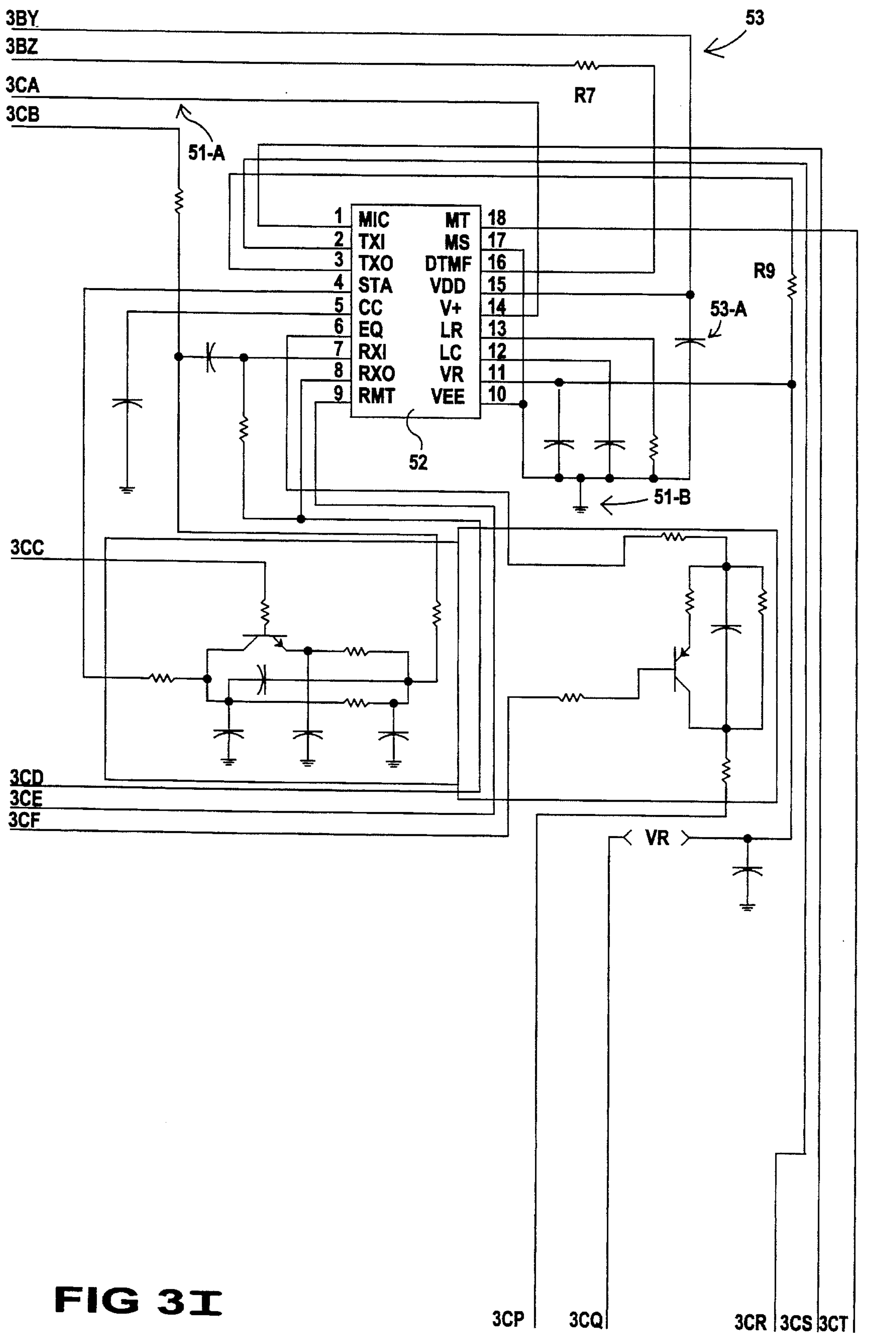
Figure 3J:
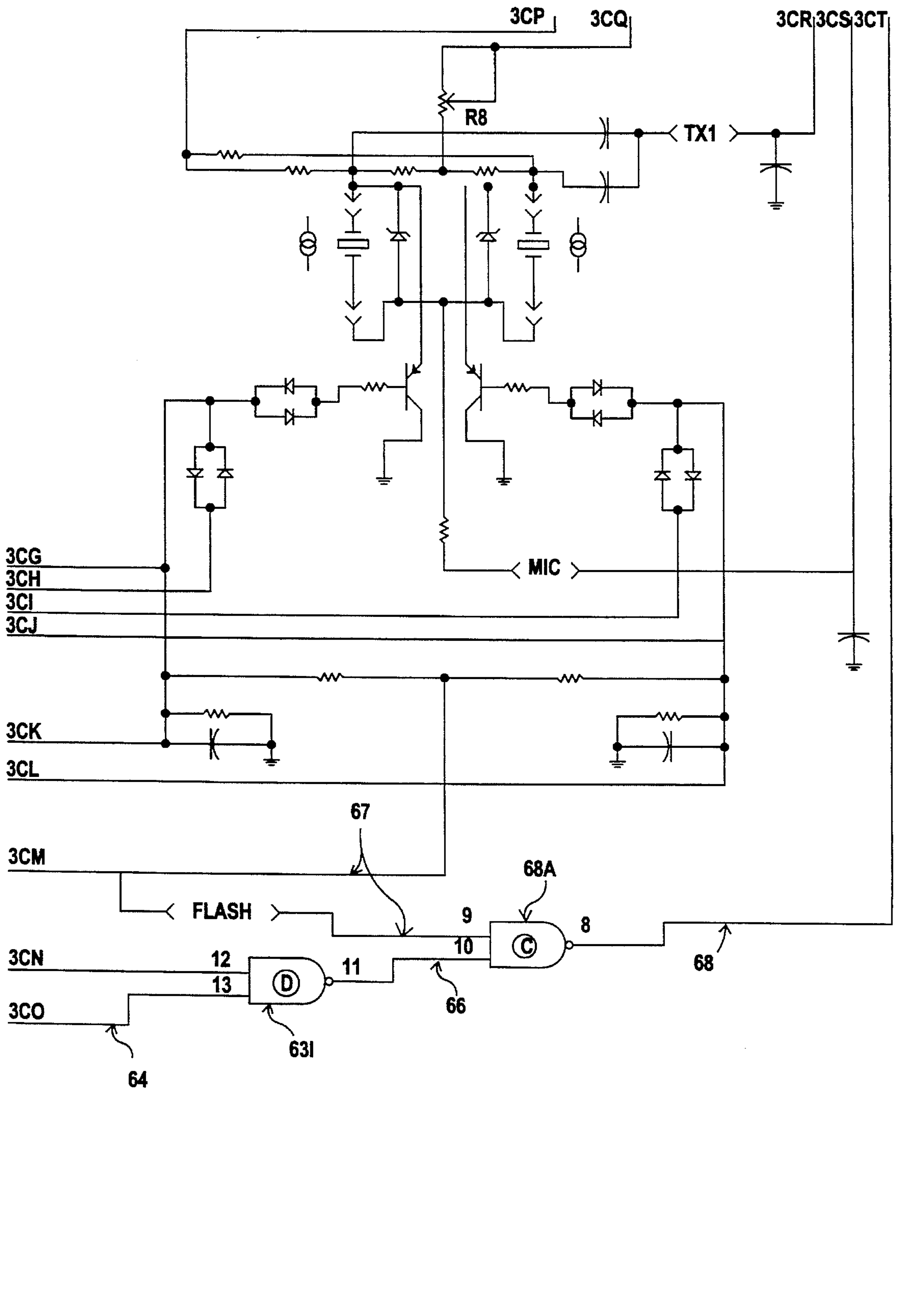
Figure 4A:
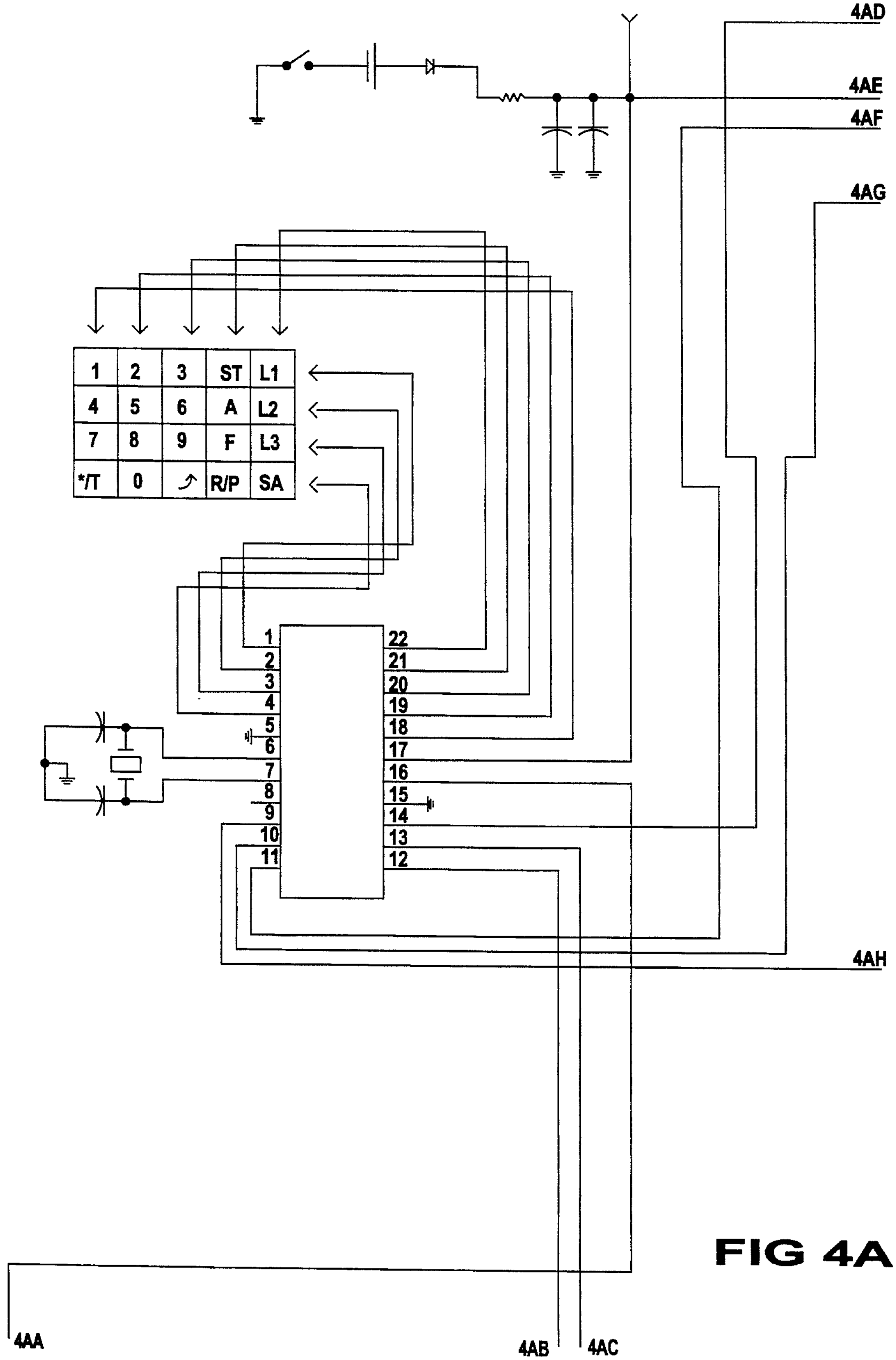
FIG. 4 is an electronic schematic diagram of the invention with emphasis on the linear circuits illustrated.
Figure 4B:
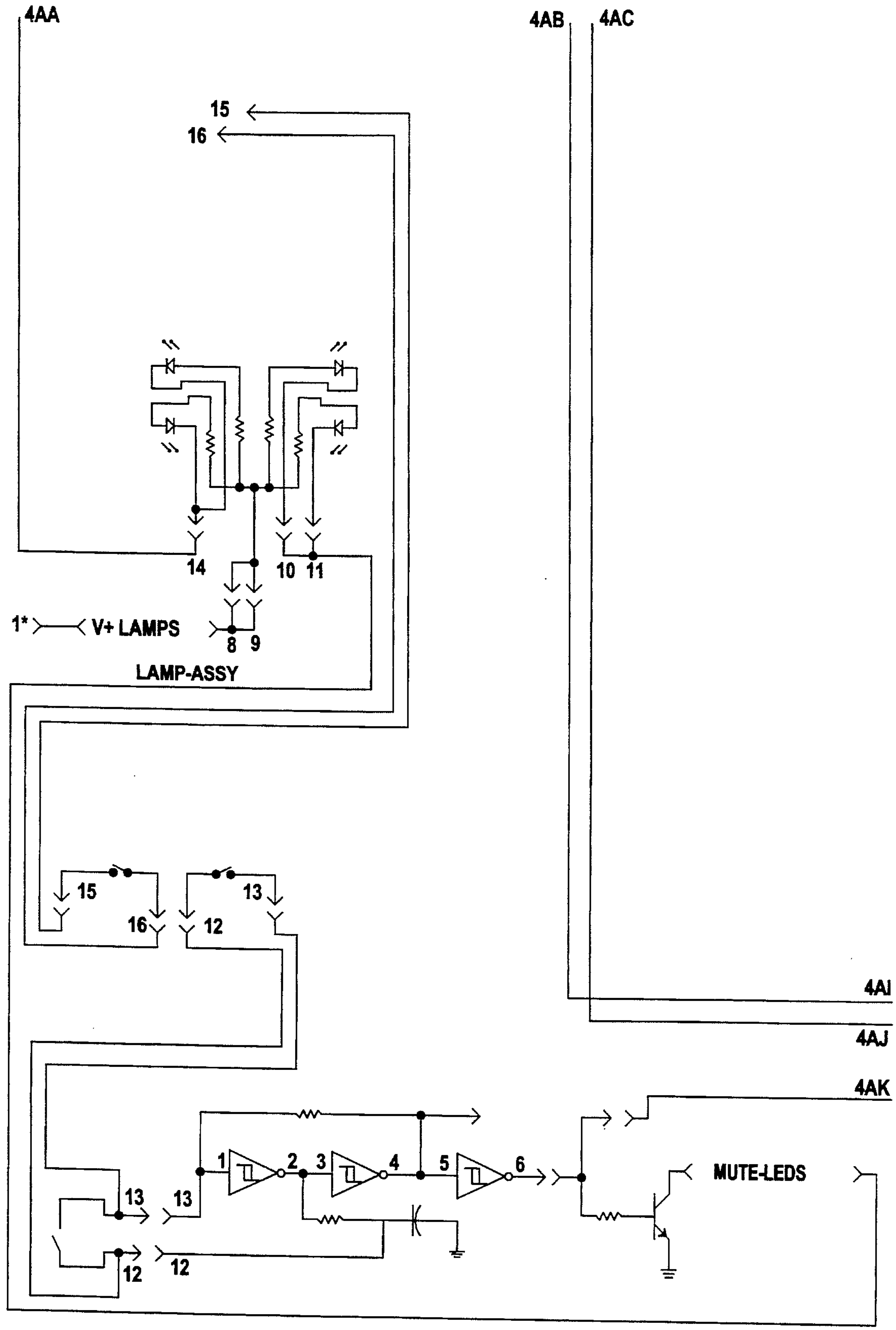
Figure 4C:
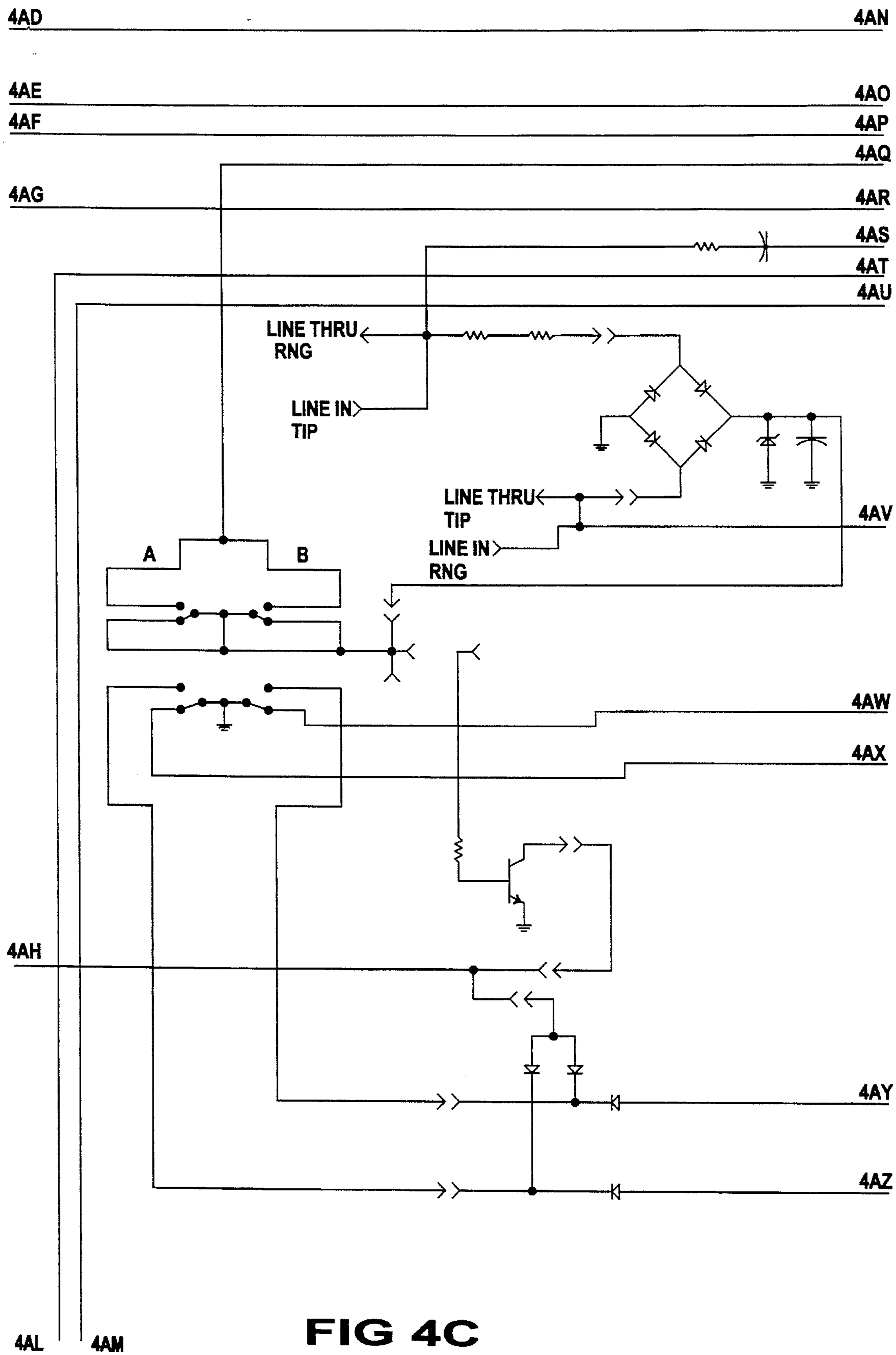
Figure 4D:
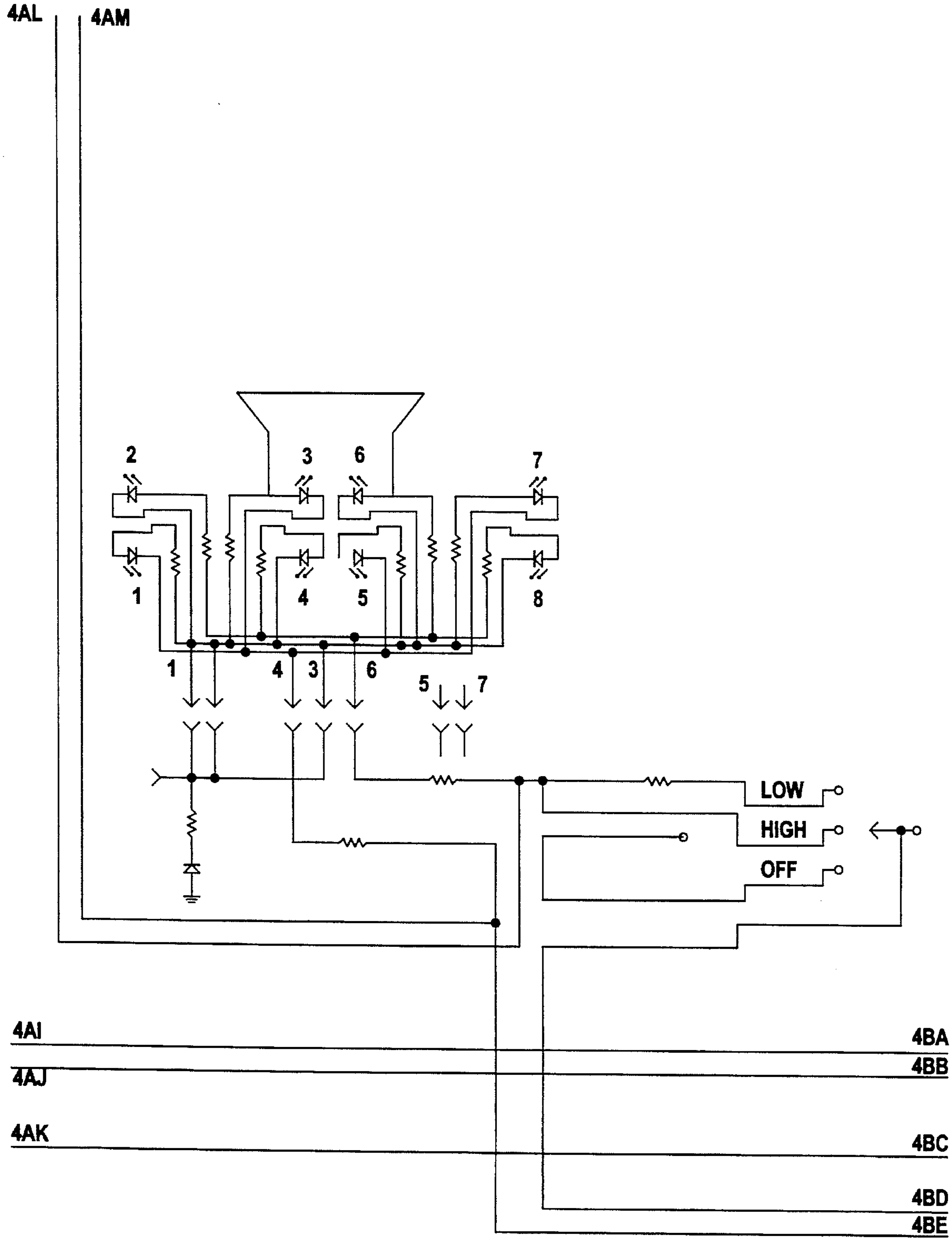
Figure 4E:
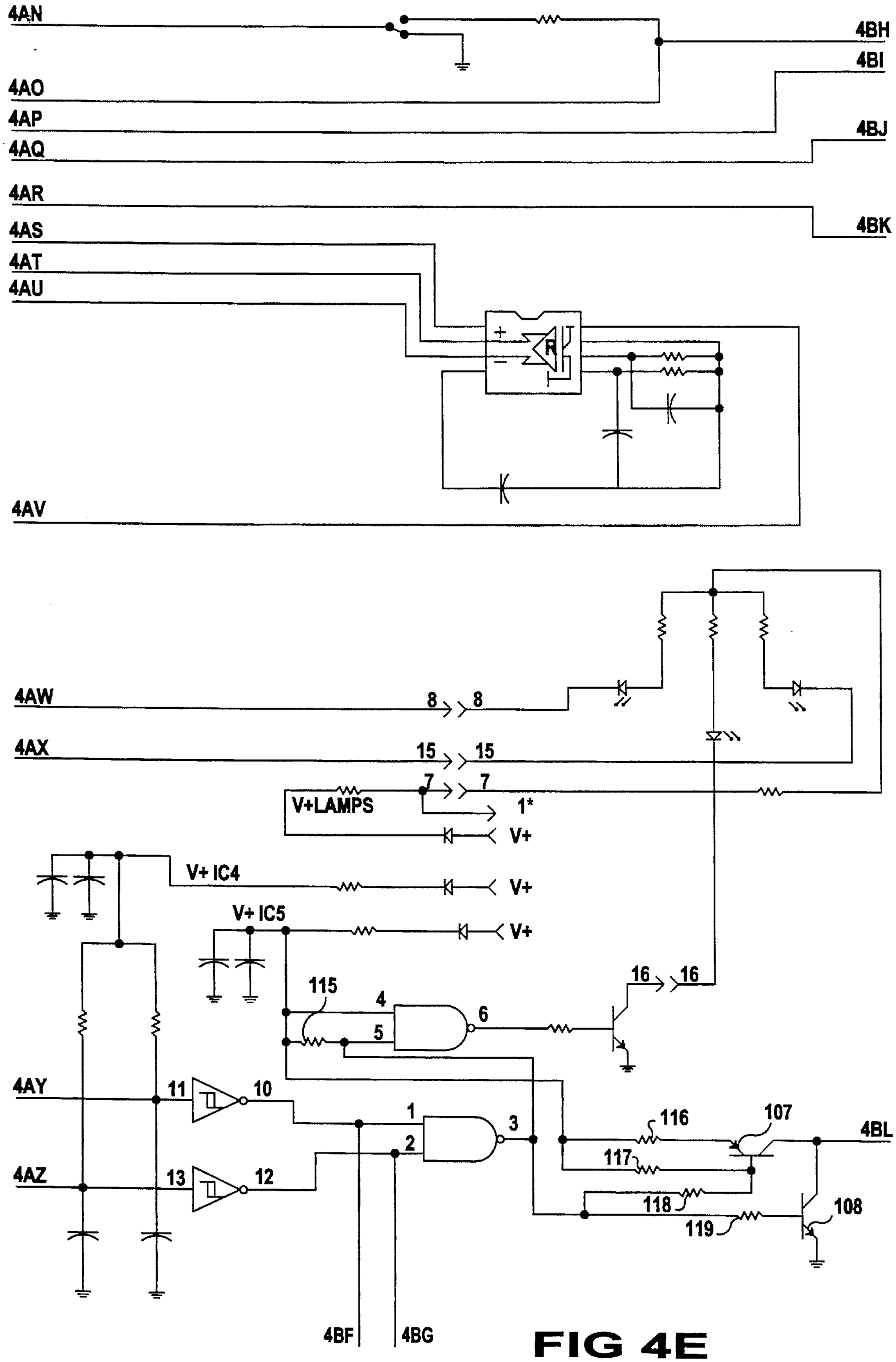
Figure 4F:
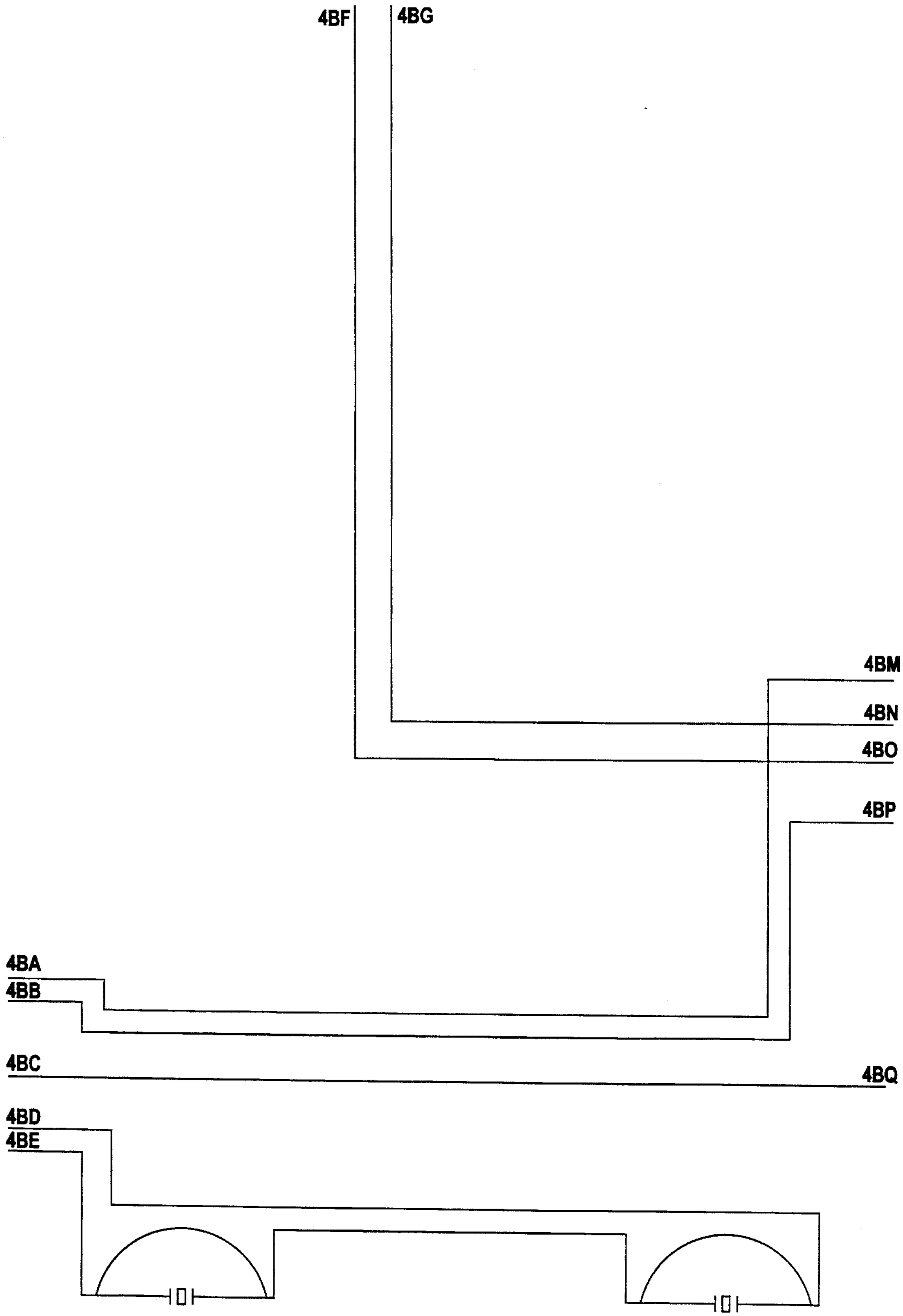
Figure 4G:
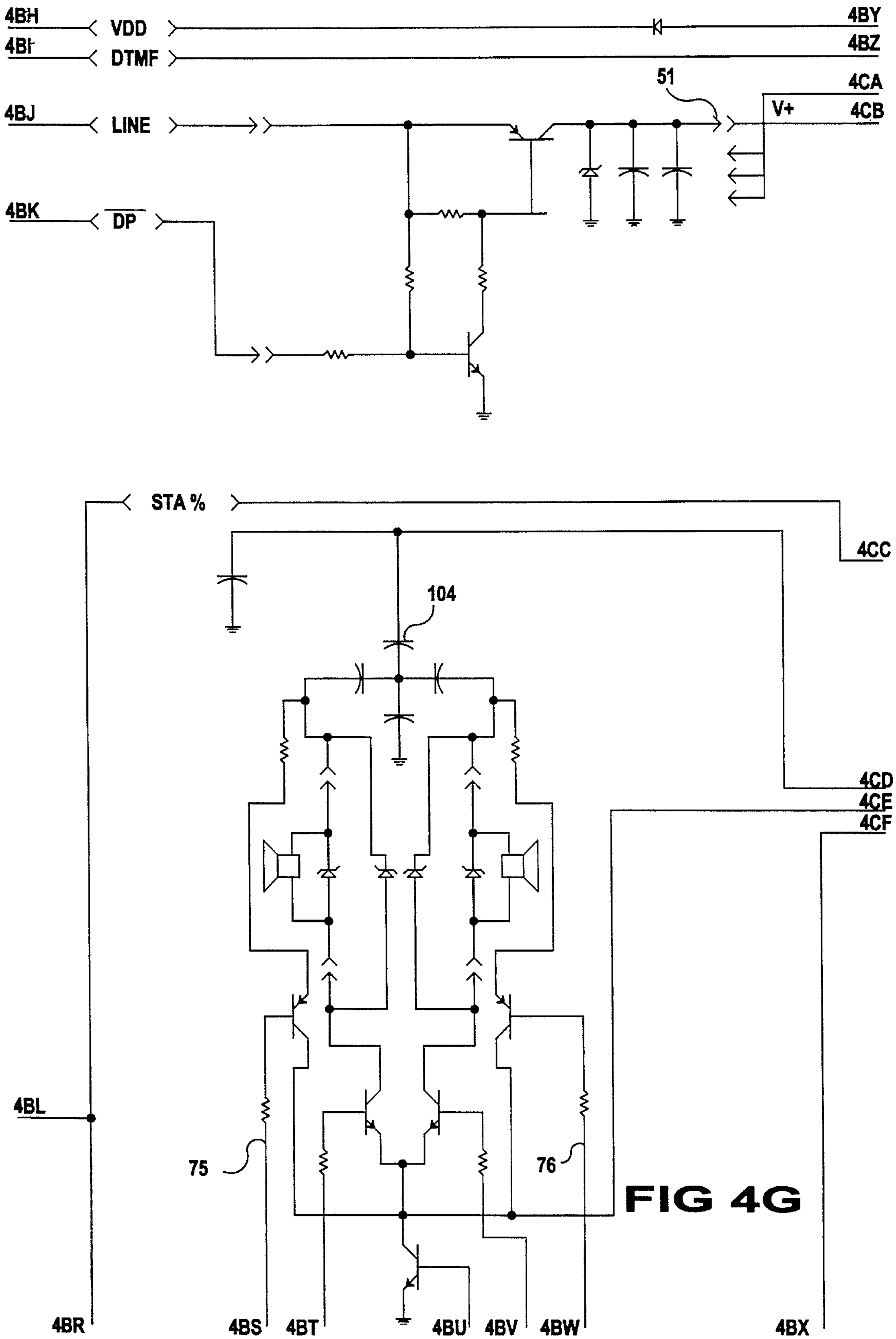
Figure 4H:
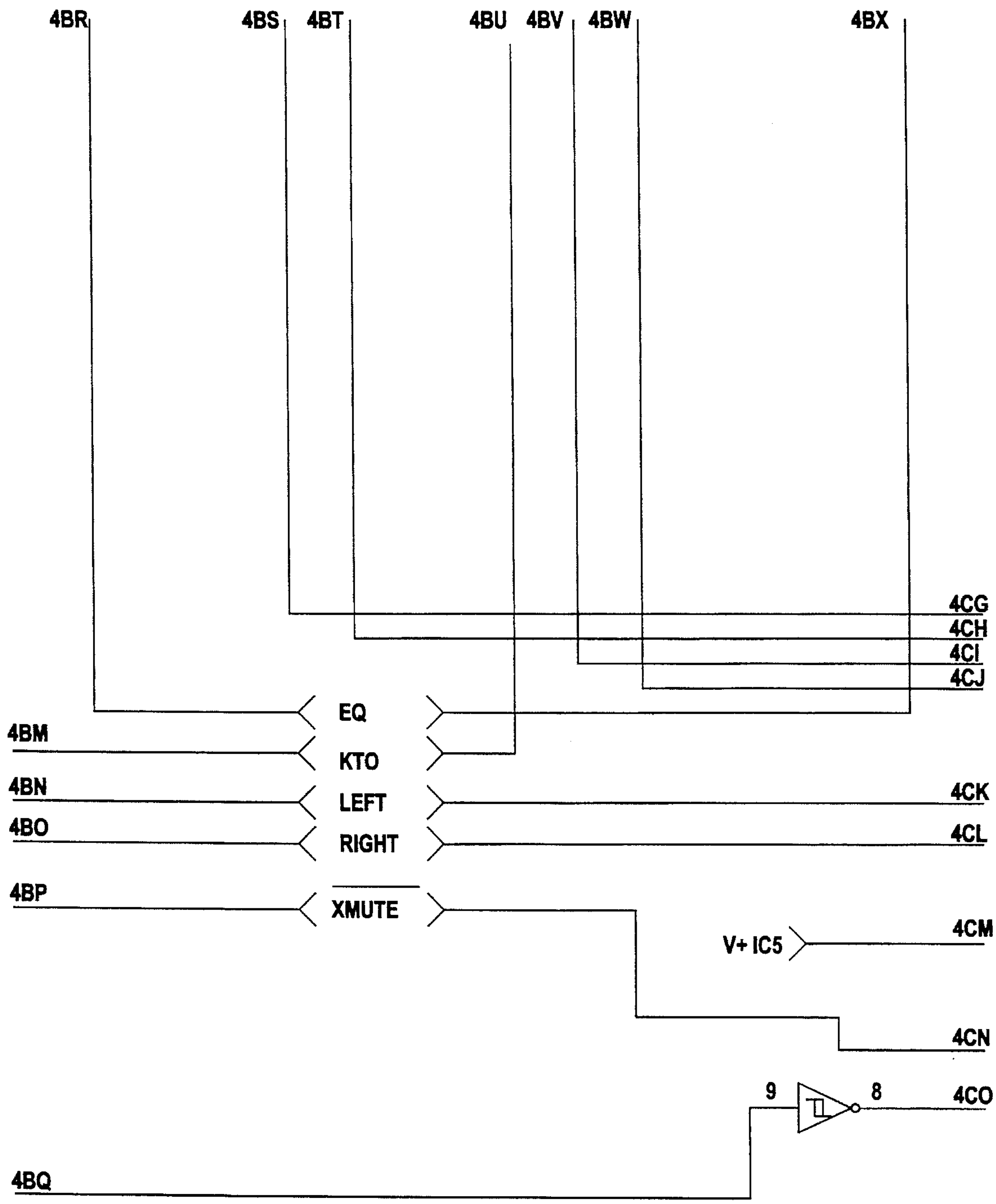
Figure 4I:
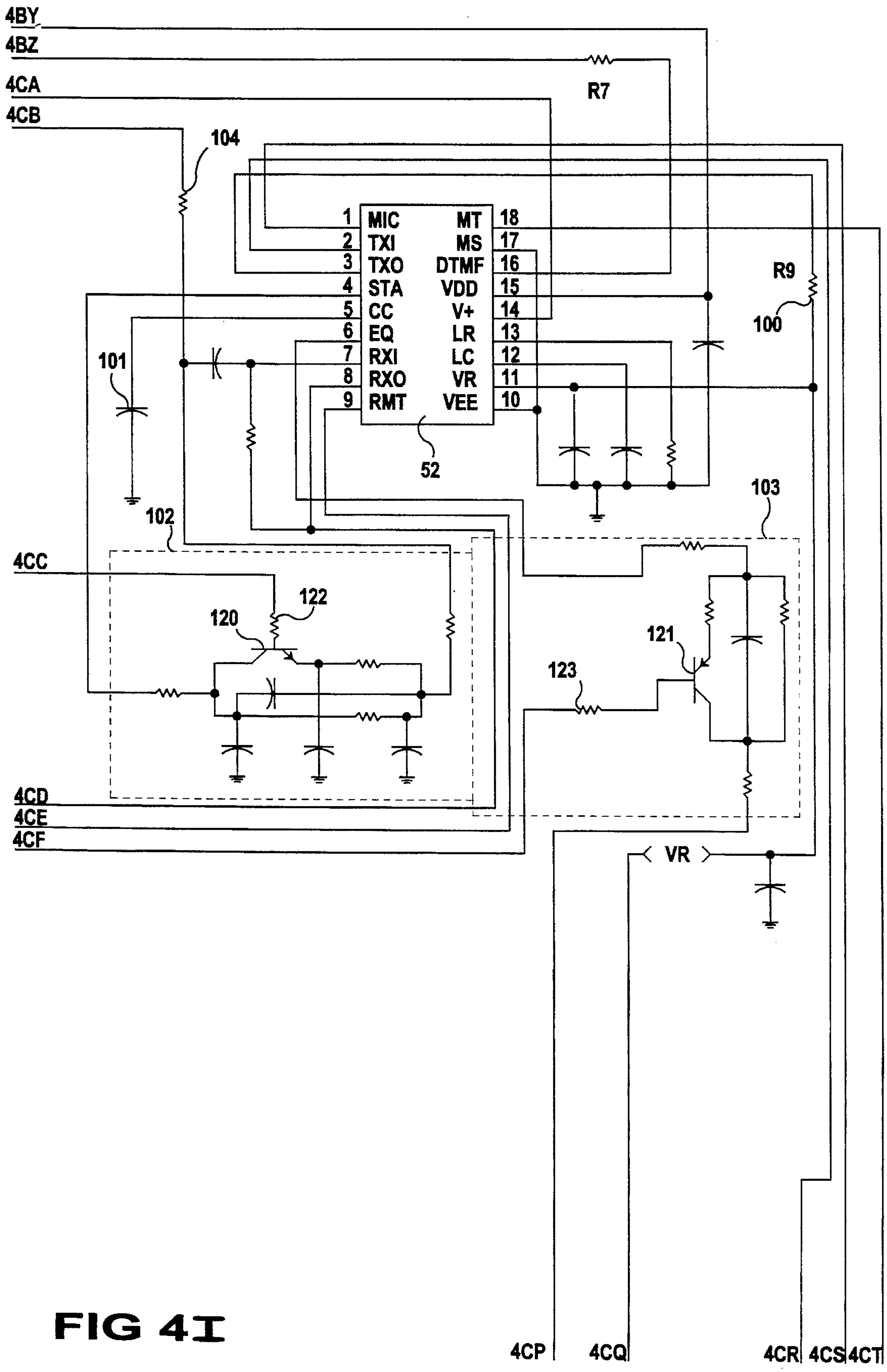
Figure 4J:
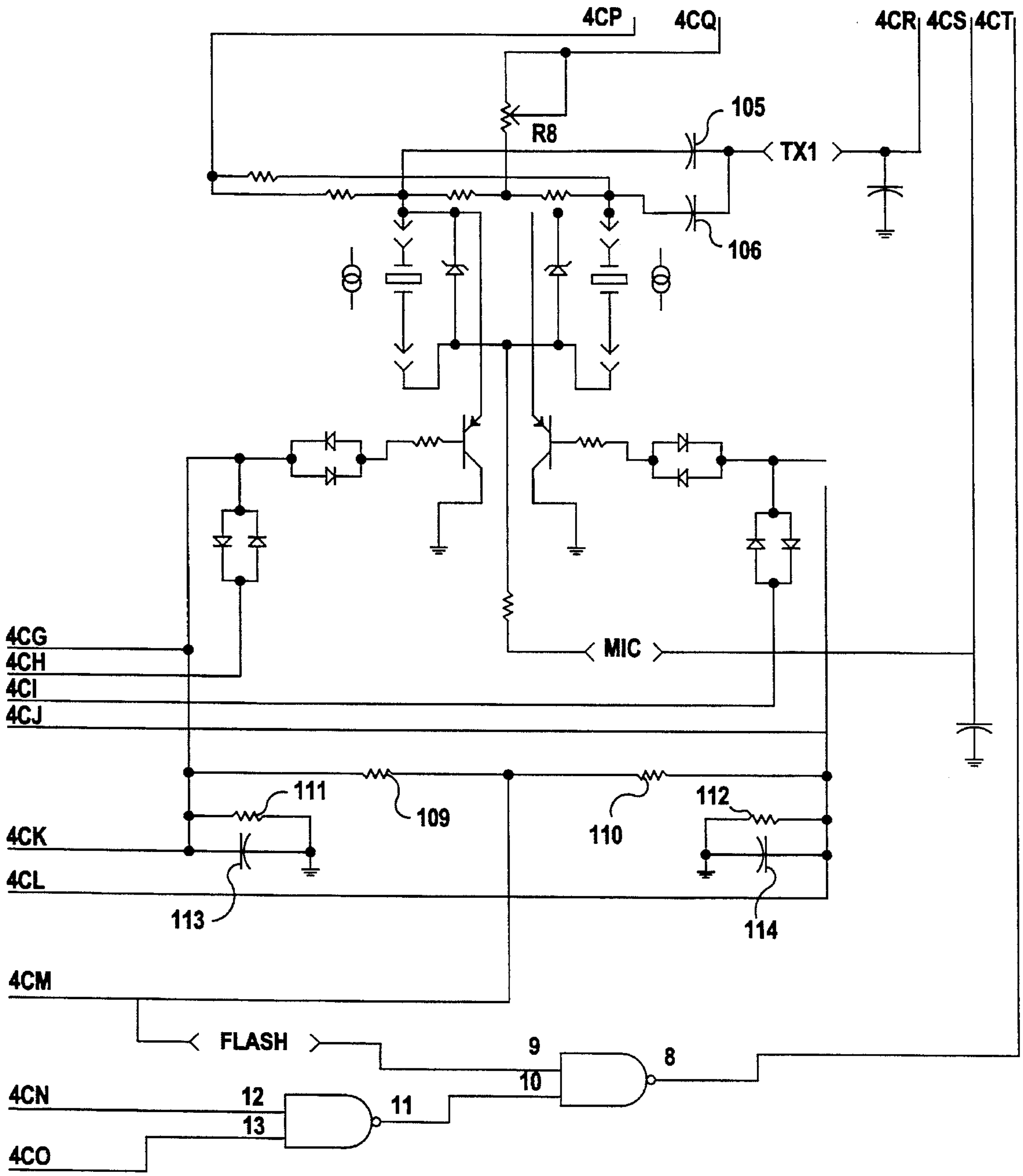

FIG. 1 is an overview of the invention. FIGS. 2, 3, and 4 show various sections highlighted.

The main components in the system are best illustrated in FIG. 1. There is a left A cradle switch 200 that is normally down when a left phone is in this cradle. Likewise, there is a right cradle switch 202 that is normally down when a right phone is in this cradle. There are two telephone sets comprising a left earpiece 204 and a left mic handset 206 and a corresponding right earpiece 208 and a right mic handset 210. Earpieces and mic headsets are typically combined into one integrated unit. A touchtone DTMF pad 212 allows the user to dial calls. When calls are incoming, flash-bar 214 flashes a visible signal. Also when calls are incoming, right and left bells 216 and 218 sound in an audible and interesting pattern. The loudness of the bells is controlled by switch 220 which provides for no bells ("OFF"), low or high. When the left handset is in use, a green arrow lamp 222 lights. When the right handset is in use, a red arrow light 224 lights. When both headsets are in use, a blue light 236 lights. Dialing can be switched between pulse-type and tone-type by using switch 226. Redial is accomplished using switch 228 which activates redial and the lighting of redial indicator 230. Hold in initiated by depressing switch 232 which activates a hold feature and the lighting of indicator 234.

The following refers to FIG. 2, rows 2 and 3, column E. An industry standard input connector, in the rear of the "You Talk Two Phone" called 'Line In', provides a red/green, twisted wire pair soldered to the PC board at the input arrows 1. Correspondingly, a red/green, twisted wire pair is soldered off the same points, with this twisted pair's destination being an industry standard connector (also, not shown), (pinned and pigtailed as the first said 'Line Input' connector for ease of manufacturing), but this time phase reversed (red to green, green too red) as labeled 3 and 4. This connection for the "Line Thru" connector is located one-half inch to the right of the "Line In" connector on the rear-center of the "You Talk Two Phone" telephone base housing. This "Line Thru" output connection on the rear housing, simulates the metallic wire output "wall" connector, and is an integral part of every "You Talk Two Phone" for the following two reasons.

First for the convenience of the consumer, an additional "You Talk Two Phone," or any other desired standard telephone equipment, may be readily hooked in proximity of the "You Talk Two Phone" without the need for an 'expansion adapter' or additional wall outlet, etc. The second reason is that if an optional 9 volt standard battery holder, modified with an SPDT safety switch, (assembly not shown), is fit within the "You Talk Two Phone" to "normal" the "Line Input" traces 1 and 2, when a 9 volt dc battery is indeed inserted in said holder, the "You Talk Two Phone" is safely 'lifted,' (both potentials), and the standard two wire extension presently appearing at the "Line In" connector, becomes an open circuit. However, the 9 VDC properly impressed across 1 and 2 and an additional industry standard, two wire telephone hook-up cable connected from the "Line Thru" of said "You Talk Two Phone", to the "Line In" connector of an additional "You Talk Two Phone" (this unit of course having no battery inserted since it would indeed 'open' the "Line In" normal of its own line input), affords the consumer the option of private, part-time intercom use.

The electrical potentials existing on 3 and 4 are hardwired to ring (–) and tip (+) output arrows respectfully via the series resistors 6, and are hard-wire jumpered straight across to their correspondingly input arrows of the same name. Resistors 6 are 10 ohm, ¼ watt resistors that serve both as a light resistive series isolation pad, separating the Polarity Protection Bridge assembly 7, and all subsequent electronic audio circuitry thereafter, from the potentials appearing at 2, 4, and 5. In the case of a malfunction, short, or dangerous voltage overload from the input connectors 1 and 2, resistors 6 act as 'fuses,' which will open the circuit path of tip(+) output arrow immediately following the resistors, thereby protecting the telephone unit against fire, shock, or other damages that may occur to the electronic components. Resistors 6, as well as all other resistors except Flash-Bar, 30, and Re-dial/Hold Lamp assembly (row 6, column A, B) LED series current-limiting resistors, are typoically metal film, 1%, ¼ watt resistors. This was done solely for low noise and close side to side matching. The above mentioned tip(+) and ring(–) output arrows and tip(+) and ring(–) input arrow connections wired directly to the Polarity Protection Bridge Assembly 7, are jumper strappable at these points, such that the Bridge Assembly 7, may be wired before (pre), or after (post), the Hook Switch Mechanical Assemblies, A and B, simply by wiring the tip(+) output arrow into J-1 (31), re-routing 49-A over to the tip(+) input arrow of Polarity Protection Bridge assembly 7, taking the final output line 8 of Polarity Protection Bridge assembly 7, which is FIG. 8, and plugging line 8 into the "Electronic Switch" line input arrow 50-A in FIG. 3. These and other programmable jumper variations are necessary so that units intended for sale in foreign countries can readily meet legal standard or specification guidelines enforced by different world wide telephone standards (specifically the two conductor metallic wire type), distribution networks, and other carrier office equipment, without any change to the original PC layout or electronic design. If it becomes necessary due to differing telephone standards, additional components (e.g., resistors, chokes, transformers, diodes, etc.) can be readily inserted instead of hard-wire jumpered. Additionally, these "in" and "out" jumper spots also aid in testing and repairing of the unit itself.

The components in Protection Bridge assembly 7 are standard practice in electronic telephones of this class and comprise a standard bridge configuration. The anodes of the diodes in 7 are tied together and form the circuit ground, or analog and digital 'zero volt common.' Tip(+) and ring(−) are impressed as shown; the zener diode in 7 provides over-voltage protection, and the capacitor in 7 helps suppress click and high frequency noise of rf, by providing them with a quick path to circuit common. Finally, the output potential of 7 is wired to J1 (31), via the trace 8. This completes the discussion of the Polarity Protection Bridge assembly 7 and it's input/output wiring, programming, and isolation/protection components (6, 8, 31, 49-A, 50-A, tip(+) and ring(−) arrows, J1 and J2).

Referring once again to the input section of FIG. 2, the electrical potentials existing at 3 and 4 are branched off to feed their respective "Ringer System" input requirements, via hardwire circuit traces 9 and 5. The "Ringer System" itself is comprised of:

(1) IC #1 (FIG. 12), the Motorola MC34017; an eight-pin, monolithic, ringer subsystem containing the following features:

- (a) The input impedance signature meets Bell and EIA standards.
- (b) An on-chip diode bridge, SCR transient clamp, and zener reference-good dial pulse rejection and a ringer equivalent=0.5
- (c) An input current mirror, a threshold comparator with an internal reference, and a programmable sense input, Pin #5 (RS).
- (d) An on-chip relaxation oscillator, which can be governed externally by one resistor and one capacitor applied from Pin #6 (RC) to Pin #7 (RG—reference ground), followed by a warble modulator, which alternates between two distinct divisions of the fundamental frequency of the relaxation oscillator output as a function of the threshold comparator. This modulated signal is then fed to the push-pull output buffer amplifier.
- (e) An on-chip, push-pull output buffer amplifier, which is internally protected, biased, and regulated in a very unique manner, making possible the necessary isolation characteristics required by the unique electrical design of the "You Talk Two Phone's" 'Ringer System' output signaling devices. (This will be explained later when we 'Bells' 16–19 and Flash-Bar 30 are discussed.

(2) Support components (3 capacitors and two resistors) connected to reference ground 13 of IC#1 (12).

(3) Support components: coupling capacitor 11, and line input resistor 10.

Trace 9 is connected to Pin #8 of IC #1 (12) and trace 5 is connected to the left side of resistor 10, which continues into capacitor 11, which in turn continues into Pin #1, line in (+), of IC #1 (12).

'Ringer System' output signaling devices. As described in the previous section IC #1 's final output stage is a push-pull configured, buffer amplifier whose high phase appears on output Pin #2, and low phase appears on output Pin #3. Due to the working components of IC #1, having a private internal circuit reference ground-return Pin #7, and the hardwire trace 13, it is possible to place the center of this peak-to-peak range, approximately 11 VDC, and use it as a buffer amplifier return, or 'floating ground.' This is done by developing the isolated ground potential with respect to electronic screen ground, which is originated at the polarity-guard input bridge, FIG. 7, thus maximizing all of the isolation and protection features of IC #1, as well as insuring maximum stability in the operational performance of IC #1.

Pin #2 of IC #1 (12), 0+, is routed via the circuit trace 14 to the junction of resistors 24A and 25 at 24. Pin #3 of IC #1, 0−, is routed via the circuit trace 15-A, to the resistor 26 and via hardwire trace 15-B to the minus input to Left Bell 16. The circuit potential appearing at 24 divides to feed two individual output signal device subsections (unique to the "You Talk Two Phone") which are: (1) a "Flash-Bar" 30, and (2) a "Bell-System" 16–19 and 21–24. The "Flash-Bar" 30 is a separate electronic sub-assembly which screw mounts to the inside rear face to the "You Talk Two Phone" such that fully screwed tight into position, provides an "inlay smooth fit" of this thin, horizontally oriented "visual output" LED display "Bar," (faces front as seen by the consumer.

Electronically speaking, the visual "Flash-Bar's (30)" exact schematic, including ribbon cable IDC pin numbers z1 through z7 (numbered out arrows pointing downward) is encompassed within the dashed line. The other feed is again split via resistor 24-A, which in turn feeds one of three, normally open contacts of "Bell Switch" 20A in this case the top contact labeled "low," via the hardwire trace 23. Trace 24 is directly connected to the middle contact of "Bell Switch" 20A labeled "high" (22). The remaining open contact at the bottom of "Bell Switch" 20A labeled "off" (21), is connected to an electronically meaningless trace, and symbol, and is synonymous to 'no connection,' or 'open circuit.' The two feeds from the junction 24, to "Bell Switch" 20A are considered to be the 'high side' inputs of the "Bell System" (16–19, 20–24). 20 is the selector arm of the 3 position "Bell Switch" 20A, which is attached via trace 19 to the plus side of the Right Bell 18.

Electronically speaking; the "Bell System" ringer output subsystem described above and the "Flash-Bar" must be considered separately even though their high and low input feeds are parallel each other (traces 14 and 15) after discounting 49 ohm resistors 25 and 26 in each input leg of the "Flash-Bar". The reasons for this are: (1) the "Flash-Bar" circuit is common to screen ground, due to floating common, and is only reactive in its interaction with the distributed impedance of the "You Talk Two Phone" PC board layout as a whole; and (2) "Bell System" presents a totally reactive load, spanning across the entire peak-to-peak span of the push-pull output amplifier and having only half its typical capacitance value.

As can be seen for both sub-assemblies, the push-pull action across these circuits causes illumination of LED's L1, L3, L5, and L7 and accentuates the left bell via damping and phase reversal during the B cycle, and likewise alternately causes illumination of LED's L2, L4, L6, and L8 and accentuates the right bell via damping and phase reversal during the A cycle.

Since the left-right pizeo-electric 'Bells' are physically mounted to opposite ends of the same PC board, the net acoustic result of a fully assembled "You Talk Two Phone" is a truly unusual sonic quality which can generally be described as 'big' and 'far reaching' regardless of its overall level. This spatial scattering effect, unique to the two bell transducer configuration, is actually a function of the human 'ear-brain' system, coupled with typically non-uniform acoustical environments, additional Doppler skew contributed from the warble generator of IC #1 (12), and aesthetically speaking, provides for a very 'musical' bell.

Likewise, the extremely tight fit of the horizontal Flash-Bar 30, which is rear mounted from the inside housing, and protrudes exactly to the level of the outer most front panel facie, appearing as a frosted glass inlay at the top face of the "You Talk Two Phone" is as well a truly unusual, visual ringer, or ring indicator/flasher. The horizontal Flash-Bar itself, is hand built from four industry standard rectangular, clear-lens, super bright LED's. Green is used since it is the easiest to see. Once fused together with super glue, filed, and 'frosted', it appears as one solid, 'glass' bar, with eight tiny dots (the actual LED's) buried deep inside the bar, and equidistantly spread across the center of the bar.

The electronic design of the Flash-Bar assembly 30, the previously discussed bridging, steering, and "floating common" strategies of 14, 15, 20–29, and its commonalty with the circuit labeled 'Bells,' 16–24, gives this alternating odd-even flash bar a unique, visual ring signature, which is easily noticeable in most ambient light conditions.

Referring now to FIG. 3, the following sections will be discussed:

(1) Hook Switches A and B (37 and 38), and contact and S1–S14.

(2) The Dialer Interface 48, its support components and functional wire connections 48A through 48H.

(3) The Electronic Switch 50, 50A, and 50B (all components).

(4) The 'Wake-Up' Power Sequence:

(a) The V+ distribution bar 51 and 55.

(b) The Speech Network, IC #3 (52), its main input power requirements 51, 51A, 51B, and its on-chip VDD regulator, support components, and output routing 53, 53A, and 54.

(c) The three isolated voltage rails, 55 2* V+Lamps (all components), 55 3* V+ IC #4 (all components) and 55 4* V+ IC #5 (all components).

(5) Main Logic and steering, 31–45, and all labeled component designators of this central section.

(6) The 'Hold-Generator' lower left corner of FIG. 3) (all designated components) and initial logic states immediately following "Wake-Up."

(7) Final Steering—Mutes (lower right hand corner, FIG. 3) all remaining logic, designated components, and initial logic states immediately following "Wake-Up."

Assume that a call is presently incoming, and that both hand sets A (37) and B (38) are still on the hook. The bells are ringing loudly, and the Flash-Bar is winking its LED's back and forth.

The Dialer interface, IC #2 (48), is presently dead in this first example due to the fact that SW1 (test/defeat) of 48C is open, defeating all the circuitry of 48C. With no dc at the onset of operation, the dialer interface IC #2, has no data of any previous operations, stored phone numbers, tone/pulse mode (of toggled by keypad or SW5, 42D) and is not the first to respond under this condition.

This is a hard power-up, similar to the 3.2 VDC (Li) battery of 48-C being either missing or dead. Given this situation, IC #2 (48) must wait for IC #3's (52), internal VDD regulator to ramp up fully 53, 53A, and impress across diode 54, which is the back blocking diode to keep the potential at trace 48F (when back-up battery circuit 48C is 'on' normal operation) from the rest of the system. A power-up in this condition is as follows: IC #2 (48) is still 'dumb,' and the phone is still ringing. The output of the Bridge section is wired hard through into J1 (31), and is tied to the normally closed contacts S2, S10, as well as the commons S3, S11, via the hard-wire potential of 36. Note that switch A and switch B are mechanically separate and physically located under each hand set cradle. Each switch is an SPDT spring-loaded momentary (non-latching) switch. 'A' switches are (1) S1 N.O. S2 N.C. S3 COM. (2) S4 N.O. S5 N.C. S6 COM., 'B' switches are (1) S9 N.O. S10 N.C. S11 COM. (2) S12 N.O. S13 N.C. S14 COM., the contact numbers were dubbed in order and wired to the ribbon cable IDC and PC board 16 way male output connectors. The output of the first 'A' switch 37, Pin S1 (N.O.) and first 'B' switch 38, Pin S9 (N.O.) are hardwired together to form potential 49A, which is hardwire patched into "electronic switch" 50, at the line in, series-pass input arrow 50A, as well as simultaneously routed to J5 (31A). This is an extra feature for both absence of backup battery 48C, or a "magic eye" "off hook control flag" such that lifting one, or both hand sets, the potential at 49A, would be impressed on resistor 32, forward biasing transistor Q3 (33), such that circuit ground is present via the wire strapping trace 34, into J3 (34A) and J4 (34B) inputs, whose common potential is hard wired via 47, into Pin #9 of IC #2 (48), called Hook Switch (HS) input, where if the chip were 'wet,' that is SW1, FIG. 48C was closed and 'smart' or 'awake,' then wired or configuration diode 44 and diode 45 the normal and always wired condition 46, J4 (34B) would start the turn-on sequence much cleaner since in this sequence, once flagged low at Pin #9, IC #2 (48) is not waiting for VDD to power itself, so supplied by internal VDD regulated output of IC #3 Pin 15(VDD) 53, 53A across diode 54, finally waking IC #2 (48) by the proper voltage appearing at 48F, but instead would have itself, IC #2 (48), initialized all sections of its own internal workings and all the output control signals which in turn control the steering, XMUTE (IC #2 (48), Pin 13), also DP (IC #2 (48), Pin 10), which turns on "electronic switch" 50, via hard-wire trace 49B, through resistor 50C to the base of transistor Q1 (50D) via "electronic switch" control input arrow, FIG. 50B. This would then allow the potential of 49A to appear via Q2 (50E), at input arrow #1, which is the "raw" V+ distribution bar 51, continuing onto IC #3(52), Pin 14, via hard-wire trace 51A waking up IC #3 (50), and finally activating the VDD output, IC #3 (52), Pin 15, to be the dominant VDD used and felt at diode 54, and hard-wire trace 48F, during operation and use of the "You Talk Two Phone." Further, the normal sequence, (SW1 closed, battery powering IC #3 VDD during hand sets 'on-hook' (HS=Hi at 47)) is reliable and stable since after DP activated available potential of 49A, through Q2 (50E), one or the other or both hand sets now 'off-hook' and into 51, 51A, raw V+, local PC board, output distribution jumper arrows D2, D3, D4 (51), which mate to their corresponding V+, raw input arrows 2*, 3*, 4* (55) provide three separate, diode and resistor isolated, dc power rails. The top rail designated V+ Lamps, enters at 55 2* input arrows, to the anode of RED lamp 55A. The cathode of RED lamp 55A, feeds resistor 55B (27 ohm), and is output to arrow #7, for the most positive potential of the three "hand set active" LED indicators. The others, 55 (3* and 4*), enter at anodes 55C and 55D, the cathodes of which lead to the 10 ohm protection dropping resistors 55E and 55F, and then to their own 0.1 uf bypass capacitors 55G, 55H, and finally their own 22 uf 55 VDC electrolytic bulk capacitors 55I, 55J. These isolated power rails are labeled as V+ IC #4, V+ IC #5 and are required for reliable Logic operation. They power and initialize said IC's at the same instant as the speech networks and have all logical conditions set up and stable before the speech network reaches full swing operation Summary. The Dialer interface IC #2 (48) is always kept on and alert, via its battery-power subsection 48C. SW1 closure makes all signals (48A–48H and 47 and 48B) fully functional even though the "You Talk Two Phone" is shut off (still ringing or not, both receivers in cradle). Lifting A, B, or both hand sets initiates a clean, controlled, stable power-up by simply allowing a low (circuit ground) to diodes 44 or 45 or both, which in turn starts the sequence. Q3 (33) is of no consequence here. DP (49B), turns on raw V+(51, 51A, 1, 2, 3, 4) which in turn feed 55-2*, 55-3* , 55-4*, powering all logic to stable initial conditions before IC #3 (52) is fully on line.

If the back-up battery of 48C is "dead" or "missing," Q3 (33), will insure a hook switch flag (34) at J3, at all times a positive potential, mechanically delivered to 49A. Again, this is a "hard start up" in which the positive potential 49A, will self-activate "electronic switch" 50, through resistors 50F and 50G, regardless of control input 49B. Once V+ appears at 51, 1, 2, 3, 4, and 51A, logic is powered via individual DC rails fed in at FIG. 55-3* and 55-4*, as is the DC lamps rail, fed from 55-2*, and the logic steering and hold generator input and output conditions are ready and stable for IC #3 (52). This is true of the logic subsections regardless of battery in/battery out/dead battery condition.

Finally, if IC #3 (52) conditions are satisfied, it goes into speech mode and its VDD output of 3.3 VDC is output via trace 53, then appears at diode 54, at last powering IC #2 (48), and providing the proper signal conditions and allowing full functionality of the dialer and proper stability of all control signals coming in or leaving IC #2 (48).

Answering an incoming call. Before answering, SW1 of 48C is closed, placing the "You Talk Two Phone" in normal operation. The hand set A is lifted. This allows the spring-loaded, lever-action switch A (37) to spring upward to its 'home' position, simultaneously throwing the ganged armatures of switch A (37), S3 and S6. These are the commons of both independent electrically isolated, non-latching SPST subsections of 37. Contacts S1, S2, S3 are dedicated to the line potential; and contacts S4, S5, S6 are dedicated to passing screen ground (circuit common) to properly flag the steering logic.

In the up position, the line potential, hard-wired to both the common S3, and the normally closed (down) contact of S2, is now connected to contact S1 of 37, via contact S3, thereby impressing the potential arriving at J1 (31), and wired switch common 36, normally the Bridge output, onto the wired or common of 'A' contact S1's normally open (down), and 'B' contact S9, normally open (down), which is the circuit tract 49A, terminating at input 50A, the line in of electronic switch 50.

Note that: (1) switch 'A', (37), and switch 'B', (38) are drawn and wired as a mirror image of each other making them both physically and electronically exact functional equivalents. Thus, S1=S9, S2=S10, S3=S11, S4=S12, S5=S13, and S6=S14. The contacts are numbers according to the ribbon cable conductor numbers to which they are attached and hard soldered on the assembly. The primary design goal of these combined assemblies was to physically isolate signals from their own returns as well as the sends and returns of the alternate side, keeping all wiring absolutely short as possible, logically and functionally consistent, yet still disconnectable. (2) the 16-way PC board mating is followed by two rows of 16 gold bar jump holes, adjacent to each other, allowing these remote electronic functions all possible circuit hook up combinations inside the PC board. Due to their layout, these remote circuit entities aid in maximizing overall performance with respect to distributed inductive capacity, minimum crosstalk, voltage and noise strays, and rf or pf interference. In addition, this mirror type wire layout maximizes common-mode rejection.

Finally, circuit common, evenly distributed across the ribbon, is sent to diode blocked Logic, instead of routing actual internal logic "signals" or positive voltages on and off the PC board. With these strategies in mind, referring back to FIG. 3, the left hand set switch A (37), when up, connects the circuit common potential of 41, which is hard wired to contact S6 switch A (37), and its mirror image functional counterpart, contact S14 switch B (38), to the normally open contact S4, switch A (37), while simultaneously de-asserting the previously grounded potential, forced at contact S5, switch A (37).

When ground is lost at contact S5, hardwire connection 39, corresponding mating connectors, Pin #5, IDC female 40J, and Pin #15 of connector 40K, have been de-asserted by 39A.

Inside the PC board, a gold wire, as previously mentioned, jumps #5 input arrow over to trace #15's input cup 39B, where it continues out of connector #2, FIG. 40J, re-routed back up the same physical ribbon it came in on, 39C, but this time on a different unique wire, that is, conductor #15, 39D, which in reality, is the low side of the right hand set "on" indicator, a red arrow-shaped LED, FIG. 55A, located just above the centrally located keypad, and pointing right. The high side of this red arrow is in series with a current limiting resistor, FIG. 55L, and is then connected in series to an additional 10 ohm resistor, FIG. 56B, the other side of which is fed directly from connector #2 (40K), input Pin #7. The corresponding mated, Pin #7, the male pin of connector #2 (40K), on the PC board side, is the output of V+ Lamps isolated DC supply rail 55-2*.

As previously described, the 'wake-up' power will be readily available within a fraction of a second, no matter what switch is up, if not both. Therefore, the path to ground, originating at contact S5 at 39, and ending on Pin #15 of trace 39D, is virtually a single point to point dedicated circuit path having no other connection possibilities, makes the right hand set 'on' indicator a unique function of the left hand set's 'hook switch' A (37), hence, it's status.

Now, the left hand set is lifted off hook, and the right hand set, presently still in its appropriate cradle, keeps switch B (38), held in the 'down' position. Notice that the upper "line carrying" contacts of both switch A (37), contacts S1, S2, and S3, and their contact counterparts, switch B (38) contacts S9, S10, and S11, are wired so as to not only avoid signal contention, in any or all switch combinations, but are in addition physically combined in such a manner as to make the combination of wire and contact surface "feel" the same in complex distribution, admittance, and distributed inductive/capacitive situations, by configuring them in a manner that will change the least.

When switch A (37) was picked up, common 41, contact S6, was passed to 42, which is ribbon wire #4, which in turn passed through its connector where its 0 volt level is impressed at the cathodes of silicon diodes 44 and as well as 61. The presence of ground at 61, was not valid for a short period of time, as diode 44, flagged IC #2 (48), which subsequently initialized the full 'power on' and stabilization of all circuits as previously described; and furthermore, terminated the incoming ring causing the Central Office to cease the ringing signal V+ lamps, active at this time. Green lamp 55D finds it ground return through contact S14, 40, 40A, 40B, and 40C, to the cathode of the green arrow (left hand set active), thereby illuminating threshold dependent IC #1 (12) and its associated support components, cease operation, and Flash-Bar (30), and audible bells (16–24), if not already defeated on purpose via the switch 6 (21) "off" position, will also cease to operate.

It is during this time that the remaining steering signals must have all their valid logical input contenders present and accounted for, such that all the complex linear networks described in the next section, have a window of time to reasonably achieve a balance, stable, and operating range by the time the speech network ramps up to full operation. This guarantees against latch-up, feedback, intermittent changes in gain and phase, or low frequency beating. Further, intermittent logic conditions, not to mention inaudible bursts or continuously oscillating high frequencies, can radically reduce power, performance, audio quality, and general functional reliability.

Finally, the entire device being powered directly off the Telephone Company office battery, and self-steering recombinant individual linear subsections playing off the complexities of the Speech Network, as well as being an 8 way hybrid, which must logically inter-steer the instantaneous differences required for all existing combinations that are encountered in the world of twisted pair metallic wire communications, not forgetting actual ambiance and vibration or acoustical interactions of two or more hand sets in close proximity and their electrical reactive characteristics, "walking all over the place," due to reaction time of phase shift compensation networks reacting to finite propagation paths of first order acoustic reflections, or independent hand sets, picking up a localized source, but at differing room locations, sum these electrically, "luring" this interactive 8 way hybrid, if not momentarily, to head in the wrong direction.

Because of the CMOS logic design, its layout paths, and its commonality with the "derived" DC V+ 4+5 screen common, and the actual analog controlling elements or subsections these logic gates finally feed, the design of the "You Talk Two Phone" must be considered totally from a 'linear' point of view. Subsequently, the net instantaneous sum of all the above complications can be simultaneously riding on every DC rail, as well as forcing screen ground modulation, which if overlooked, may amplify or cancel when impressed onto different circuits not previously foreseen, or too complex for analysis.

This slight diversion will aid in understanding the previously mentioned complexities relating to the final stages of steering. The completion of the final steering theory leads us into the final discussion that will explain the design of the 'Eight-way linear hybrid' and the tricks used to achieve it. Let us now complete our discussion of logic particulars and then onto the final discussion.

As last mentioned, the green arrow LED (55M) was illuminated through a dedicated normalling path, provided by switch B (38), hook switch down condition, making these criss-crossed normal conditions mutually exclusive of each other. In other words, if switch A is up, it is impossible for the red arrow 55A to illuminate; and likewise, if switch B is up, it is impossible for the green arrow 55M to illuminate. This is done such that when either A (37), or B (38) are lifted, their associated indicator arrow will be hanging on the V+ the instant it is impressed across the V+ distribution buss 51, insuring a "dummy load," as the active steering circuitry discussed above, attains its proper valid logic levels. The "dummy load" is not only for hand set indication, but is an integral parallel current path which works in conjunction with the DC load resistor of IC #3 (52), the Speech Network IC, which aids in its protection and stabilization during the power up sequence. Since the manufacturers recommended value in that location was purposely reduced to 27 ohms, instead of the typical 47 ohms, this allows the chip to work harder by sinking the extra current through the 'Eight-way linear hybrid' support circuitry surrounding the speech network. Each hand set condition has one, and only one, indicator "dummy load" tailored both to the brightest possible arrow indication, subjective matching, and proper shunting capability for reduction of clipping distortion with respect to IC #3 (52).

The third condition is the blue LED 55N, which must have active logic available to illuminate it via its return wire, 57, connectors 16, and the collector of Q4 (58). The base of Q4 (58), is fed directly by its own buffer IC 58C Pin #6 via a 10,000 ohms resistor 58A. The buffer IC 58C has one of its inputs, Pin #4, pulled up hard to the V+ rail during power up. The other input is the positive, Pin #5, pulled up through a 28,000 ohms resistor 62B, which is tied via the circuit trace of 62A, whose output is Pin #3 of IC 58D. IC 58D's output Pin #3 is a low true condition stating that the output of the left main steering buss 60E, is a logic "high," and the output of the right main steering buss 61E, is a logic "high". This is the necessary condition which would illuminate the blue LED 55N via the high at 61C turning on Q4 (58). These left and right main steering busses are generated at power up as the first stage active steering outputs of Schmitt-trigger 58F, Pin #12 (61C), for the left main, and Schmitt-trigger 58E, Pin #10 (60C), for the right main.

The first stage steering inputs of Schmitt-triggers 58F, Pin #13, the left side, and 58E Pin #11, the right side, are ramped up, or slightly delayed on purpose resistor 61A, which is a 240,000 ohms, 1%, resistor. The top of the resistor is connected to the isolated V+ IC #4 power rail, and the bottom is common to both the anode of diode 61, the left input logic diode, and the top of capacitor 61B, which is a 0.1 uf capacitor, providing the charge up delay path to Pin #13. Likewise, the top of resistor 60A a 240,000 ohms, 1%, resistor is connected to the isolated V+ IC #4 power rail, and the bottom is common to both the anode of diode 60, the right input logic diode, and the top of capacitor 60B, which is a 0.1 uf capacitor, providing the charge up delay path to Pin #11.

In summary, this steering logic insures proper protection against start up instabilities by providing one of three possible LED's to illuminate with respect to which hook switch is up, and thereby having a proper current shunt for the wake-up condition of IC #3 (52), the Speech Network. The pull-up resistor 62B, not only insures that the buffer IC 58C, which drives Q4 (58) to illuminate the blue LED (55N), will start up on the right foot, which is off. For a split second, even if both hand sets were lifted off at the same instant, either the left arrow, or the right arrow, will momentarily flash on until logic finally illuminates the center LED. Also, by virtue of the fact that the instant both A and B are up, the red and green LED's have lost their criss-cross ground returns making it impossible for either of them to be on. Resistor 62A, also provides a power-up path for the final steering section, Q15 and Q16 (not yet discussed), which govern the proper logic inversion of the "both" the low logic output IC 58D Pin #3 (62), and the proper drive current required to operate switched filters #1 and #2.

The main left buss 60E, and the main right buss 61E, and the main "both" buss 62, all continue into transistor switching sections in the next section.

The last logic contingency in the final steering is the output of IC68A, Pin #8 (68), called the "mute master buss." This line is a direct trace which drives IC #3 (52) Pin #18

(52), which is called MT, which when asserted a Logic Low, puts the speech network's on-chip enable-disable logic in the disable state by internally opening the microphone return path, IC #3 (52), Pin #1, and the receiver return path, IC #3 (52), Pin #9, yet remaining on or, still on the line, for either prevention of audio at the chip (hold mode), or for DTMF, or Pulse Dialing, to prevent loud clicks and tones during the instant of each key press, and additionally enabling the internal and dedicated DTMF amplifier on board the chip, during and only during, the tone dialing sequence, thus maximizing the chip's drive ability during this time.

Since on initial power-up, IC #3 (52) comes on internally muted for a predetermined amount of time before coming on line (a design feature of the speech chip itself), the mute master command is already in its normal, power-up status, thus applying a high logic level at IC #3 (52), Pin #18, and being inconsequential until Pin #18 is "ready" to be commanded.

This master mute command is governed by two distinct inputs. One input is governed by a logic subsystem called the "hold generator," 63, and the other input is governed by an output logic flag, called XMUTE, originating from IC #2 (48), Pin #13 (48), the dialer interface. This signal is one of the first valid signals during the power-up sequence. Since as discussed above, the normal operation of the "You Talk Two Phone" is such that the battery back-up of 48C is always on, making IC #2's (48) logical output decisions already valid at the time V+ (51), receives power and initiates the rest of the system. IC #2 (48) is always 'smart' in the normal operation and in a sense, commands the entire system.

The 'hold generator' is a CMOS toggle flip-flop, that instantly upon feeling a voltage potential on V+ IC #4 power rail, wakes up with a locked position of IC #4C, Pin #4, a logic high, which is directly buffered by IC #4C, and wakes up inverted to a logic low, Pin #6. IC #4, Pin #6, fans out to two distinct places: resistor 63B, a series fed, 1000 ohm resistor to the base of Q5 (63C), an NPN transistor, whose base is an on-off control for the "hold" LED's, FIG. 63G, of the redial/hold lamp assembly. This illuminates when the user of the "You Talk Two Phone" asserts the hold button 63E, such that the closure of lead in conductors #12 and #13 toggle this initially "off" hold generator 63, to "on." The high logic level appearing at Pin #6 turns on Q5 (63C), which saturates and allows current to flow from ground at its emitter, thereby turning on or lighting up the hold push button LED's. Again, this is an alternate action push-on, push-off type of circuit, which wakes up off, speaking with respect to its final output drive, IC 63H, Pin #6.

Pin #6 of IC63H-A, is routed to the input of IC63H-D, Pin #9 (63A), where it is again inverted, appearing at the output pin #8, and connected to IC 631, Pin #13, via the circuit trace 64.

The logic high appearing at IC 631, Pin #13, along with the above mentioned logic high from the dialer interface, XMUTE, IC #2 (48), Pin #13 (65), cause the "do not assert" 'mute' or 'hold' decision, which is the logical output of IC 63I, Pin #11. Finally, this condition which is applied via the circuit trace 66 to the input of IC #68A, Pin #10, along the hard pull-up to IC #5 V+, via the circuit trace named 'flash,' 67, which is always asserted to the input of IC 68A, Pin #9, causes the NAND gate of IC 68A to be a buffer/inverter, providing inversion of the logic low of 66, at IC 68A, Pin #8. This is the final mute steering whose wake-up high convention is applied as the sole master mute control line to IC #3 (52), Pin #18, the Speech Network. This line will go low only if the dialer interface IC's (48) Pin #13 goes low, indicating a DTMF tone, or stream of make-break pulses, or the user requests hold mode as mentioned above, which will assert a high at 63A. Either one or both can steer to finally mute Pin #18. This completes wake-up and hold logic, and final steering (39, 40–46, and 60–68).

FIG. 4 describes the linear section which modifies the two wire to four wire conversion properties of the Speech Network. IC #3, and expands those properties to convert 4 way+4 way into 2 way, or 4 way+4 way disabled into 2 way.

The primary goal is to give the Speech Network a subset of conditions that make it possible for its transmit gain to change if another microphone is paralleled to the transmit input Pin #2; and, to make it impossible to detect a loss of listening level at the ear piece of a currently active hand set, if one or more ear piece of like characteristics were to be added in, or taken away. Furthermore, to keep fractional and re-combinant complex summing currents in fixed, and predetermined ratios such that equivalent and opposite power contributions allow maximum balance, minimum power loss, and widest possible range of dynamic line length compensation distributed across the entire single unit as a whole.

The best way to accomplish this task is to balance the unit for its full-load duty. This entails creating a circuit such that the Speech Network has two electronically isolated mic paths. The mic paths are equidistantly branched off of one regulated series feed and two electronically isolated ear piece paths, and configured in such a way as to feel as one steady "normal" receive amplifier load.

Fortunately, the mic and the receiver ear piece will be switched in or out as a functional grouping. They are a mathematical mirror images of one another (as hand set units [mic-speaker combinations]), contribute specific attributes, and are interactive with respect to the total power and total efficiency of communication across a two wire circuit.

The single line is now evenly distributed across a 2, 4 way reactive and consequently paired (physically coupled) hand set circuit. These two 4 way, reactive hand sets are now maximized for performance with respect to the outside world, and it is this efficiency which will be the normal operating center. Should we now wish to take one of these "hand set circuits" off line, we need to carefully substitute whichever one we decide to "shut off" with equivalent characteristics so that IC #3(52), with respect to its circuit loads and mixing currents, won't know the difference. Since the hand sets contribute equal and additional circuit loading, their mirror image dummy load's must contribute congruent attributes so the initial full load 8 way, single line unit, is now a balanced power 4 way by 4-dummies/return branches, divider networks to 2 way transformed through IC #3 (52). The strategies to isolate and divide all working currents used in the "You Talk Two Phone" up in a maximum number of equal and opposite divisions, such that individual constituent paths each have minimal influence on total power balance.

Before we discuss all the unique circuit paths and fan outs of the linear expansion circuitry, there are two value modifications affecting the first order performance of IC #3 (52).

First, the DC load resistor R5, is reduced from the normal manufacturer's recommended value of 47 ohms, down to a value of 27 ohms, modifying the chip for lowest voltages and maximum power transfer, remembering that the two hand sets full on condition is the "normal" operation of a "You Talk Two Phone." Additional current shunting from the V+ to V− is via the pertinent hand set active LED through Q4 or hook switch ground return.

Second, R9 (100) modulates the V+ by dropping the TXO and producing an AC current through the VR series pass. This resistor is increased by 20 ohms from the manufacturer's recommended value of 200 ohms, up to a value of 220 ohms, changing series path summing characteristics of the two microphone, parallel arrangement, or the equally lopsided dummy load of the bypassed speaker/ear piece, EQ to VR resistor branch, capacitively coupled TX1 common.

A compensation capacitor 101 of 4.7 uf was added to Pin #5 and hard grounded to help stabilize the additional branching network surrounding IC #3 (52).

There are two, dual-valued, switched electronic filters: (1) Switched filter #1 (102) advances or retards phase for "both hand sets on," totally split divide reactive loading or "one (left or right) hand set on," series RC dummy path on "defeated" or "off" hand set, series LC "on" parallel with series RC dummy to minus side of receiver output capacitor 104. (2) Switched filter #2 (103) helps expand the effective range of the line length compensation function, which is bridged equally to its respective microphone—+, circuit node, VR bias fan out branch resistors and corresponding individual input coupling capacitors, 105–106. Like switched filter #1 (actually a selectable leg of the STA), filter #2 (a selectable leg of the EQ amplifier) helps to realign the phase relationship lost due to additional divisions for isolation or power balance.

Since the "You Talk Two Phone" is self-powered, let us next look at all the parallel branches existing between the V+ that are felt at the V+ distribution bar, IC #3 (52), Pin #14, and the total equivalence of all DC working paths, from the bottom side of the three isolated power rails V+ IC #5, V+ IC #4, and V+ lamps.

Let us consider IC #3 (52) with 4.84 VDC appearing at Pin #14 with respect to Pin #10, V−, common to screen ground, being present at the V+ distribution bar, (51-D 1, 51-D2, 51-D3, 51-D4).

IC #3 (52) will consume roughly 10 milliamperes. R1 (104), which is 268,000 ohms @ 1%, is also strapped at the potential impressed at the V+ distribution bar at 51-D1 and finds possibly an additional 15,000 ohms in series with it to V−, through switched filter #1, and on through the STA output Pin #4, to V− inside the chip. These two paths total 283,000 ohms from V+ bar 51, to V−. Their effective resistance is equal to 283,000 in parallel with effective branch resistance. The 4.8 VDC is felt at the anodes of CR-L, CR7, and CR8, and drops down to approximately 4.1 VDC at the cathodes of CR-L, CR7, and CR8, continuing on through a 10 ohm series dropping resistor, 27 ohms for CR-L, to hand set active LED indicator display, then on to one of three paths to ground.

The filtered DC on the bottom of the 10 ohm dropping resistors feeds V+ IC #4 and V+ IC #5, then individually pull-up and set a bias ceiling for separate steering busses left and right logical inputs, and voltage divider limits for linear switching transistors, and gain/phase control inverter driver 107 and 108.

Note that all the transistors are run either totally cutoff, or totally saturated. Their bias trees are created in parallel paths and voltage divider branches, which are external to their immediate next higher potential. In other words, the transistor comes on, but in reality, the base currents find a unique and isolated return path, either sourced high by the chips internal V+, or sunk low preventing any circuit currents to flow across the emitter to collector, or shutting them down.

The V+ of IC #5 pulls up all the branch dividers, which are individual return, mirror image interface levels. Resistors 109 and 110 pull the left and right steering busses 75 and 76, which are outputs of IC #4, up to the V+ of IC #5's buss, through two 20,000 ohm paths, resistors 109 and 110, and connect these buss nodes through 240,000 ohms to ground. A 0.1 uf bypass adds distributed screen capacitance 113 and 114. This makes two parallel paths across IC #5 V+ of 268,000 ohms or a 134,000 ohm "presence" where the left/right steering busses rest, or center.

The other steering and switching control, or drive path, is resistor 115, 28,000 ohms @ 1%, pulls and balances a gain/phase control, inverter and buffer, Q15 (107), Q16 (108), resistors 116, 117, 118, and 119, to further pull transistors Q11 (120) and Q12 (121), via resistors 122 and 123, each 6800 ohms @ 1%. Again paths are matched and symmetrical in all configurations. Control arms to signal path switching transistors are unique returns with matched effect on total circuit power, and are not, locally common to the signals themselves. All other signals and voltages not mentioned directly above are a function of IC #3, and emanate totally from IC #3's pins. Logic at this point is static. V+ lamps supplies only an indicator arrow, unless mute or redial are commanded to back light, in which case speech mode is negated, hold mode or dialing mode mutes, lamp V+ climbs slightly.

In summary, the total power on V+ is the speech chip two low-power CMOS logic IC's #4 and #5, and one predetermined "hand set active" LED dummy shunt.

The single Speech Network, IC #3 (52), provides all the necessary primary sources of 4 way operation, and in conjunction with the steering, biasing, and resistive branching, switched and private path isolate, expansion and support circuitry (as depicted in FIG. 4.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. A telephone system comprising:

a. a first telephone handset comprising a first earpiece and a first microphone;

b. a second telephone handset comprising a second earpiece and a second microphone;

c. a first cradle into which said first telephone handset normally fits such that said first cradle is normally in the down position;

d. a second cradle into which said second telephone handset normally fits such that said second cradle is normally in the down position;

e. dialing means comprising circuitry for dialing a telephone number;

f. alerting means comprising circuitry for alerting a user that an incoming telephone call is waiting;

g. means for interfacing said two handsets to a telephone trunk line; and h. means comprising circuitry to prevent an increase or decrease in outgoing or incoming volume in response to the lifting of one of said handsets from its cradle or the return of one of said handsets to its cradle.

2. A telephone system as recited in claim 1, wherein said circuitry to prevent an increase or decrease in outgoing or incoming volume when one of said handsets is lifted from its cradle or returned to its cradle acts by substituting an electrical analog for the handset when the handset is returned to its respective cradle.

3. A telephone system as recited in claim 1, wherein said circuitry to prevent an increase or decrease in outgoing or incoming volume when one of said handsets is lifted from its cradle or returned to its cradle acts by varying the phase relationships of two telephone signals.

* * * * *